(12) United States Patent
Li et al.

(10) Patent No.: US 11,860,408 B2
(45) Date of Patent: Jan. 2, 2024

(54) OPTICAL FIBER FOR DATA CENTERS

(71) Applicant: CORNING INCORPORATED, Corning, NY (US)

(72) Inventors: Ming-Jun Li, Horseheads, NY (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 41 days.

(21) Appl. No.: 17/682,379

(22) Filed: Feb. 28, 2022

(65) Prior Publication Data

US 2022/0291445 A1 Sep. 15, 2022

Related U.S. Application Data

(60) Provisional application No. 63/158,553, filed on Mar. 9, 2021.

(51) Int. Cl.
  *G02B 6/036* (2006.01)
  *G02B 6/02* (2006.01)
  (Continued)

(52) U.S. Cl.
  CPC ..... *G02B 6/03627* (2013.01); *G02B 6/02014* (2013.01); *G02B 6/0281* (2013.01);
  (Continued)

(58) Field of Classification Search
  CPC ............ G02B 6/03627; G02B 6/02014; G02B 6/02266; G02B 6/0281; G02B 6/0286;
  (Continued)

(56) References Cited

U.S. PATENT DOCUMENTS 8,953,917 B2 * 2/2015 Berkey ............... G02B 6/0286
 385/127
9,798,079 B2  10/2017 Bookbinder et al.
(Continued)

FOREIGN PATENT DOCUMENTS

CN    104254793 B  *  7/2019  ......... G02B 6/02266
EP      2786186 B1  *  5/2017  ......... G02B 6/02266
(Continued)

*Primary Examiner* — Michelle R Connelly
(74) *Attorney, Agent, or Firm* — Kevin L. Bray

(57) ABSTRACT

The disclosure provides optical fibers that exhibit low macrobend loss at 1550 nm at bend diameters between 10 mm and 40 mm. The relative refractive index profile of the fibers includes a trench cladding region with small depth, large width and a trench volume configured to minimize macrobend loss at large and small bend diameters. The optical fiber includes an outer cladding region that surrounds and is directly adjacent to the trench cladding region and an optional offset cladding region between the trench cladding region and the core region. In some embodiments, the trench cladding region has a relative refractive index that decreases monotonically from the inner radius to the outer radius. The monotonic decrease in relative refractive index may have a
(Continued)

constant slope. The low macrobend loss at large and small diameters makes the optical fibers well suited for space-constrained deployment environments, such as data centers.

20 Claims, 17 Drawing Sheets

(51) Int. Cl.
*G02B 6/028* (2006.01)
*G02B 6/44* (2006.01)
(52) U.S. Cl.
CPC ....... *G02B 6/0286* (2013.01); *G02B 6/02266* (2013.01); *G02B 6/0365* (2013.01); *G02B 6/4403* (2013.01); *G02B 6/448* (2013.01); *C03B 2203/23* (2013.01); *C03B 2203/26* (2013.01); *G02B 6/03638* (2013.01)
(58) Field of Classification Search
CPC .... G02B 6/0365; G02B 6/4403; G02B 6/448; G02B 6/03638; C03B 2203/23; C03B 2203/26; C03B 37/014; C03B 37/01446; C03B 2201/12; C03B 2201/20; C03B 2203/22
See application file for complete search history.

(56) References Cited

U.S. PATENT DOCUMENTS

| | | | |
|---|---|---|---|
| 9,851,501 B2 | 12/2017 | Bookbinder et al. | |
| 10,048,438 B2 | 8/2018 | Bookbinder et al. | |
| 10,082,622 B2 | 9/2018 | Bookbinder et al. | |
| 10,094,975 B2* | 10/2018 | Bookbinder | G02B 6/03633 |
| 10,215,915 B2* | 2/2019 | Bookbinder | G02B 6/03611 |
| 2013/0136405 A1* | 5/2013 | Bookbinder | G02B 6/03633 |
| | | | 385/124 |
| 2013/0136407 A1* | 5/2013 | Berkey | G02B 6/0286 |
| | | | 385/124 |
| 2013/0136408 A1* | 5/2013 | Bookbinder | G02B 6/03627 |
| | | | 385/124 |
| 2014/0308015 A1* | 10/2014 | Bookbinder | G02B 6/03627 |
| | | | 385/124 |
| 2018/0031761 A1* | 2/2018 | Bookbinder | G02B 6/03627 |
| 2018/0067256 A1* | 3/2018 | Bookbinder | G02B 6/03672 |
| 2020/0319398 A1 | 10/2020 | De Montmorillon et al. | |

FOREIGN PATENT DOCUMENTS

| | | | |
|---|---|---|---|
| JP | 2015-503123 A | * 1/2015 | |
| WO | WO-2014193801 A1 | * 12/2014 | ........... C03B 37/012 |

* cited by examiner

OPTICAL FIBER FOR DATA CENTERS

This application claims the benefit of priority to U.S. Provisional Patent Application Ser. No. 63/158,553 filed on Mar. 9, 2021, the content of which is relied upon and incorporated herein by reference in its entirety.

FIELD OF THE DISCLOSURE

This disclosure pertains to optical fibers and cables. More particularly, this disclosure pertains to optical fibers and cables designed for data center applications. Most particularly, this disclosure pertains to optical fibers and cables having low macrobend loss at both small and large bend diameters.

BACKGROUND OF THE DISCLOSURE

Optical fibers are being widely used in telecommunication applications including in Fiber to the Home (FTTH), data centers, and silicon photonics. Continued demand for higher data throughput and more compact optical networks is placing increasingly stringent requirements on the performance of optical fibers. In particular, higher fiber counts in cables and limited space for fiber installation is motivating efforts to develop bend-insensitive optical fibers, which are optical fibers that exhibit minimal signal loss due to bending.

Bend loss includes signal losses due to microbending and macrobending. Microbending losses are caused by high frequency mechanical perturbations originating from external stimuli in the deployment environment of the optical fiber. Examples include lateral contact of the optical fiber with surfaces in a cable (e.g. tube wall or neighboring fibers). Physically, microbends correspond to randomly localized small radius bends (less than about 1 mm) that act along the length of the optical fiber. Microbends lead to mode coupling in the optical fiber and dissipation of power in the fundamental mode of single mode fiber into higher order modes.

Macrobending losses are signal losses caused by bending or wrapping of the optical fiber. It is often necessary to physically bend optical fiber to meet installation requirements in the field (e.g. around corners or in tight spaces in data centers or in-building networks). The bend diameter is large (greater than about 2 mm and typically on the order of tens of millimeters) and the loss mechanism is leakage of light. As the optical fiber bends, a fraction of the optical signal refracts or tunnels out of the core to the cladding and is dissipated in the protective coating surrounding the fiber. The amount of lost signal increases as the optical fiber is bent more tightly (smaller bend diameter).

The International Telecommunications Union (ITU) has promulgated a series of standards for bend loss to insure compatibility of optical fibers and systems from different manufacturers. The ITU-G.652 standard describes requirements for single-mode optical fibers and cable-based networks in broadband applications. The ITU-G.657 standard emphasizes bend insensitivity of single-mode optical fibers and imposes stricter standards for bend loss than the ITU-G.652 standard. The optical fibers capable of meeting the ITU-G.657 standard today have a trench-assisted refractive index profile. The trench is a region in the glass cladding of the optical fiber that has a low refractive index. The current design features a radially narrow and deep trench. The width (radial extent) and depth (depression in refractive index) of a trench can be designed to minimize bend loss at any desired bend diameter. Although the width and depth of the narrow, deep trench design can be adjusted to meet the ITU-G.657 standard at any particular bend diameter encompassed by the standard (e.g. mandrel bend diameters of 10 mm, 15 mm, 20 mm, 30 mm), it remains challenging to design a trench to provide an optical fiber that meets the ITU-G.657 standard over the full range of bend diameters encompassed by the standard. In today's optical fibers, compliance with the ITU-G.657 standard over a wide range of bend diameters is achieved by reducing the mode field diameter (MFD) relative to standard single-mode optical fibers. The mode field diameter of today's bend-insensitive optical fibers is typically between 8.5 micron to 8.8 micron at 1310 nm (compared to about 9.2 microns for standard single-mode optical fibers). The reduction in mode field diameter increases the bend insensitivity of the optical fiber and enables compliance with the bend loss requirements over the full range of bend diameters specified in the ITU-G.657 standard.

The reduced mode field diameter of today's bend-insensitive optical fibers is disadvantageous, however, because the mismatch in mode field diameter results in increased losses when the bend-insensitive optical fibers are connected to standard single-mode optical fibers due. More recently, optical fibers with trench designs that provide a mode field diameter of 9 microns have been disclosed (US20140308015, U.S. Pat. No. 9,798,079, 10,048,438, 9,851,501, U.S. Ser. No. 10/082,622). These optical fibers consistently have excellent bend performance (compliant with the G.657.A2 standard) at bend diameters of less than 20 microns. Due to normal variability in manufacturing, however, compliance with G.657.A2 at bend diameters of 30 mm and higher is inconsistent and the manufacturing yield of compliant optical fibers is low.

In order to have good bend insensitivity and low connectivity losses with standard single-mode optical fibers, it is attractive to develop optical fibers that can be manufactured in high yield with mode field diameter larger than 9 microns and bend performance compliant with the G.657.A2 standard at both small and large bend diameters.

SUMMARY

The present disclosure provides optical fibers with low bend loss that can be manufactured in high yield. The optical fibers have a relative refractive index profile with a mode field diameter of 9.0 μm (microns) or greater and a cladding that includes a trench region designed to minimize macrobending loss at bend diameters between 10 mm and 40 mm. The trench cladding region features a large width (radial extent) and shallow depth (depression in refractive index relative to an outer cladding region that surrounds the trench cladding region).

The present description extends to:
An optical fiber comprising:
  a core region, the core region having an outer radius $r_1$ in a range from 4.0 μm to 8.0 μm and a relative refractive index profile $\Delta_1$ with a maximum relative refractive index $\Delta_{1max}$ in a range from 0.20% to 0.50%;
  a cladding region surrounding and directly adjacent to the core region, the cladding region comprising:
    a trench cladding region surrounding the core region, the trench cladding region having an inner radius $r_2$, an outer radius $r_3$, a thickness $r_3$-$r_2$ greater than 10 μm, a relative refractive index $\Delta_3$ with a minimum relative refractive index $\Delta_{3min}$ greater than −0.30% and less than 0.00%, and a trench volume greater than 30% μm$^2$; and an outer cladding region surrounding and directly adjacent to the trench cladding region, the outer cladding region having an outer radius $r_4$ and a relative refractive index $\Delta_4$ in a range from −0.10% to 0.10%; and wherein the optical fiber has a macrobend loss at 1550 nm, in accordance with a mandrel wrap test using a mandrel with a diameter of 15 mm, less than 0.4000 dB/turn; and wherein the optical fiber has a macrobend loss at 1550 nm, in accordance with a mandrel wrap test using a mandrel with a diameter of 30 mm, less than 0.0040 dB/turn.

The present disclosure extends to:

An optical fiber ribbon comprising the optical fibers disclosed herein.

The present disclosure extends to:

An optical fiber cable comprising the optical fibers disclosed herein.

The present disclosure extends to:

An optical fiber preform for drawing the optical fibers disclosed herein.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
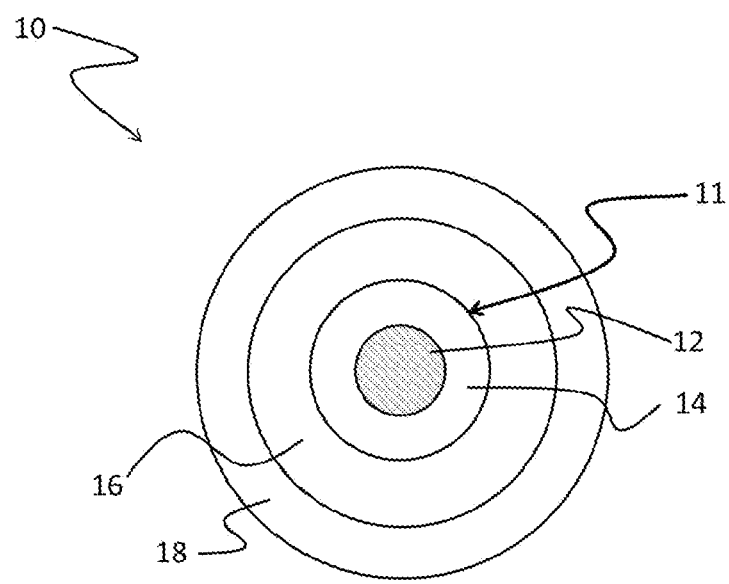
FIG. 1 is a schematic view of a coated optical fiber according to one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims that follow, reference will be made to a number of terms which shall be defined to have the following meanings:

"Include," "includes," or like terms means encompassing but not limited to, that is, inclusive and not exclusive.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When a value is said to be about or about equal to a certain number, the value is within ±10% of the number. For example, a value that is about 10 refers to a value between 9 and 11, inclusive. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "about" further references all terms in the range unless otherwise stated. For example, about 1, 2, or 3 is equivalent to about 1, about 2, or about 3, and further comprises from about 1 to 3, from about 1 to 2, and from about 2 to 3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, distance, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end point of a range, the disclosure should be understood to include the specific value or end point referred to. When a numerical value or end point of a range does not recite "about," the numerical value or end point of a range is intended to include two embodiments: one modified by "about," and one not modified by "about."

As used herein, "comprising" is an open-ended transitional phrase. A list of elements following the transitional phrase "comprising" is a non-exclusive list, such that elements in addition to those specifically recited in the list may also be present.

The term "wherein" is used as an open-ended transitional phrase, to introduce a recitation of a series of characteristics of the structure.

The terms "comprising," and "comprises," e.g., "A comprises B," is intended to include as special cases the concepts of "consisting" and "consisting essentially of" as in "A consists of B" or "A consists essentially of B".

The term "or," as used herein, is inclusive; more specifically, the phrase "A or B" means "A, B, or both A and B." Exclusive "or" is designated herein by terms such as "either A or B" and "one of A or B," for example.

As used herein, contact refers to direct contact or indirect contact. Direct contact refers to contact in the absence of an intervening material and indirect contact refers to contact through one or more intervening materials. Elements in direct contact touch each other. Elements in indirect contact do not touch each other, but are rigidly or flexibly joined through one or more intervening materials. Contacting refers to placing two elements in direct or indirect contact. Elements in direct (indirect) contact may be said to directly (indirectly) contact each other.

As used herein, "directly adjacent" means directly contacting and "indirectly adjacent" mean indirectly contacting. The term "adjacent" encompasses elements that are directly or indirectly adjacent to each other.

"Optical fiber" refers to a waveguide having a glass portion surrounded by a coating. The glass portion includes a core and a cladding, and is referred to herein as a "glass fiber".

"Radial position", "radius", or the radial coordinate "r" refers to radial position relative to the centerline (r=0) of the glass fiber.

The terms "inner" and "outer" are used to refer to relative values of radial coordinate or relative positions of regions of the optical fiber, where "inner" means closer to the centerline of the fiber than "outer". An inner radial coordinate is closer to the centerline of the glass fiber than an outer radial coordinate. An inner radial coordinate is between the centerline of the glass fiber and an outer radial coordinate. An inner region of an optical fiber is closer to the centerline of the glass fiber than an outer region. An inner region of an optical fiber is between the centerline of the glass fiber and the outer region of the glass fiber.

The term "mode" refers to guided mode. A single-mode optical fiber is an optical fiber designed to support only the fundamental LP01 modes over a substantial length of the optical fiber (e.g., at least several meters), but that under certain circumstances can support multiple modes over short distances (e.g., tens of centimeters). The optical fibers disclosed herein are single-mode optical fibers at a wavelength of 1550 nm.

"Refractive index" refers to the refractive index at a wavelength of 1550 nm.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. A or $\Delta$ % or %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by $\Delta_{ave}$ given in Eq. (2) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) for any radial position r as:

$$\Delta\% = 100\frac{(n^2 - n_{ref}^2)}{2n^2} \quad (1)$$

where n is the refractive index at the radial position r in the glass fiber, unless otherwise specified and $n_{ref}$ is the refractive index of pure silica glass, unless otherwise specified. For purposes of the present disclosure, $n_{ref}$=1.444, which is the refractive index of pure silica at 1550 nm. Accordingly, as used herein, the relative refractive index percent is relative to pure silica glass. As used herein, the relative refractive index is represented by $\Delta$ (or "delta") or $\Delta$ % (or "delta %) and its values are given in units of "%", unless otherwise specified. Relative refractive index may also be expressed as Δ(r) or Δ(r) %. When referring to a specific region i of the optical fiber, relative refractive index may also be expressed as $\Delta_i$, $\Delta_i\%$, $\Delta_i(r)$ or $\Delta_i(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r)dr}{(r_{outer} - r_{inner})} \quad (2)$$

where $r_{inner}$ is the inner radius of the region, $r_{outer}$ is the outer radius of the region, and Δ(r) is the relative refractive index of the region.

The term "α-profile" refers to a relative refractive index profile Δ(r) that has the functional form defined in Eq. (3):

$$\Delta(r) = \Delta(r_0)\left[1 - \left[\frac{|r - r_0|}{(r_z - r_0)}\right]^\alpha\right] \quad (3)$$

where $r_o$ is the radial position at which Δ(r) is maximum, $r_z > r_o$ is the radial position at which Δ(r) decreases to its minimum value, and r is in the range $r_i \leq r \leq r_f$, where $r_i$ is the initial radial position of the α-profile, $r_f$ is the final radial position of the α-profile, and α is a real number. Δ($r_0$) for an α-profile may be referred to herein as $\Delta_{max}$ or, when referring to a specific region i of the fiber, as $\Delta_{i,max}$. When the relative refractive index profile of the fiber core region is described by an α-profile with $r_0$ occurring at the centerline (r=0) and $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \quad (4)$$

"Effective area" of an optical fiber is defined as:

$$A_{eff} = \frac{2\pi\left[\int_0^\infty (f(r))^2 r dr\right]^2}{\int_0^\infty (f(r))^4 r dr}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm, unless otherwise specified.

The "mode field diameter" or "MFD" of an optical fiber is defined in Eq. (5) as:

$$MFD = 2w \quad (5)$$

$$w^2 = 2\frac{\int_0^\infty (f(r))^2 r dr}{\int_0^\infty \left(\frac{df(r)}{dr}\right)^2 r dr}$$

where f(r) is the transverse component of the electric field distribution of the guided optical signal and r is radial position in the fiber. "Mode field diameter" or "MFD" depends on the wavelength of the optical signal in the optical fiber. Specific indication of the wavelength will be made when referring to mode field diameter herein. Unless otherwise specified, mode field diameter refers to the $LP_{01}$ mode at the specified wavelength.

"Trench" or "trench region" or "trench cladding region" refers to the portion of the cladding surrounded by and directly adjacent to the outer cladding region. A trench is situated between the outer radius $r_1$ of the core and the inner radius $r_3$ of the outer cladding region and has a relative refractive index $\Delta_3$ less than the relative refractive index $\Delta_4$ of the outer cladding region. In some embodiments, a trench is directly adjacent to the core. In other embodiments, an offset cladding region surrounds and is directly adjacent to the core, and a trench cladding region surrounds and is directly adjacent to the offset cladding region, where the offset cladding region has a relative refractive index $\Delta_2$ less than the relative refractive index $\Delta_1$ of the core and greater than the relative refractive index $\Delta_3$ of the trench cladding region.

"Trench volume" is defined as:

$$V_{Trench} = |2|\int_{r_{Trench,inner}}^{r_{Trench,outer}}(\Delta_{Trench}(r) - \Delta_4) r dr \quad (6)$$

where $r_{Trench,inner}$ is the inner radius $r_2$ of the trench cladding region, $r_{Trench,outer}$ is the outer radius $r_3$ of the trench cladding region, $\Delta_{Trench}(r) = \Delta_3(r)$ is the relative refractive index of the trench cladding region, and $\Delta_4$ is the average relative refractive index of the outer cladding region of the glass fiber. In embodiments in which a trench is directly adjacent to the core, $r_{Trench,inner}$ is $r_2 = r_1$ (outer radius of the core), $r_{Trench,outer}$ is $r_3$, and $\Delta_{Trench}$ is $\Delta_3(r)$. In embodiments in which a trench is directly adjacent to an offset cladding region, $r_{Trench,inner}$ is $r_2 > r_1$, $r_{Trench,outer}$ is $r_3$, and $\Delta_{Trench}$ is $\Delta_3(r)$. Trench volume is defined as an absolute value and has a positive value. Trench volume is expressed herein in units of %Δ-micron$^2$, %Δ-μm$^2$, or %-micron$^2$, %-μm$^2$, whereby these units can be used interchangeably herein.

"Chromatic dispersion", herein referred to as "dispersion" unless otherwise noted, of an optical fiber is the sum of the material dispersion, the waveguide dispersion, and the inter-modal dispersion. In the case of single mode waveguide fibers, the inter-modal dispersion is zero. Dispersion values in a two-mode regime assume intermodal dispersion is zero. Dispersion is reported herein at wavelengths of 1310 nm and 1550 nm, and is expressed in units of ps/nm-km.

The cutoff wavelength of an optical fiber is the minimum wavelength at which the optical fiber will support only one propagating mode. Cutoff wavelength will be reported herein as a cable cutoff wavelength. The cable cutoff wavelength is based on a 22-meter cabled fiber length as specified in TIA-455-80: FOTP-80 IEC-60793-1-44 Optical Fibres—Part 1-44: Measurement Methods and Test Procedures—Cut-off Wavelength (21 May 2003), by Telecommunications Industry Association (TIA).

The term "bend diameter" refers to the diameter of the mandrel used to determine macrobend loss using the mandrel wrap test specified in the standard TIA-455-62: FOTP-62 IEC-60793-1-47 Optical Fibres—Part 1-47: Measurement Methods and Test Procedures—Macrobending Loss, by Telecommunications Industry Association (TIA).

The optical fibers disclosed herein include a core region, a cladding region surrounding the core region, and a coating surrounding the cladding region. The core region and cladding region are glass. The cladding region includes multiple regions that may differ in relative refractive index. The multiple cladding regions are preferably concentric regions. In preferred embodiments, the cladding region includes a trench cladding region. The trench cladding region surrounds the core region and is surrounded by and directly adjacent to an outer cladding region. In some embodiments, the trench cladding region is directly adjacent to the core region. In other embodiments, the trench cladding region is directly adjacent to an offset cladding region and the offset cladding region is directly adjacent to the core region. The core region, cladding region, trench cladding region, and outer cladding region are also referred to as core, cladding, trench, and outer cladding, respectively. The offset cladding region is optional and may also be referred to herein as an offset.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the offset cladding region, radial position $r_3$ and relative refractive index $\Delta_3$ or $\Delta_3(r)$ refer to the trench cladding region, radial position $r_4$ and relative refractive index $\Delta_4$ or $\Delta_4(r)$ refer to the outer cladding region.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the core region is the central region of the glass fiber and is substantially cylindrical in shape, and that a surrounding optional offset cladding region, a surrounding trench cladding region, and a surrounding outer cladding region are substantially annular in shape. Annular regions may be characterized in terms of an inner radius and an outer radius. Radial positions $r_1$, $r_2$, $r_3$, and $r_4$ refer herein to the outermost radii of the core region, offset cladding region, trench cladding region, and outer cladding region, respectively. The radius $r_4$ corresponds to the outer radius of the glass fiber.

When two regions are directly adjacent to each other, the outer radius of the inner of the two regions coincides with the inner radius of the outer of the two regions. In one embodiment, for example, the glass fiber includes a trench cladding region surrounded by and directly adjacent to an outer cladding region. In such an embodiment, the radius n corresponds to the outer radius of the trench cladding region and the inner radius of the outer cladding region. In embodiments in which the relative refractive index profile includes a trench cladding region directly adjacent to the core, the radial position $r_1$ corresponds to the outer radius of the core and the inner radius $r_2$ of the trench cladding region. In all embodiments herein, the trench cladding region has an inner radius $r_2$ and an outer radius $r_3$. In embodiments having an offset cladding region, the radius $r_2 > r_1$ and corresponds to the outer radius of the offset cladding region and the inner radius of the trench cladding region. In embodiments without an offset cladding region, the radius $r_2 = r_1$ corresponds to the outer radius of the core region and the inner radius of the trench cladding region.

The following terminology applies to embodiments in which the relative refractive index profile includes an offset cladding region surrounding and directly adjacent to the core region, a trench cladding region surrounding and directly adjacent to the offset cladding region, and an outer cladding region surrounding and directly adjacent to the trench cladding region. The difference between radial position $r_2$ and radial position $r_1$ is referred to herein as the thickness or width of the offset cladding region. The difference between radial position $r_3$ and radial position $r_2$ is referred to herein as the thickness or width of the trench cladding region. The difference between radial position $r_4$ and radial position $r_3$ is referred to herein as the thickness or width of the outer cladding region.

The following terminology applies to embodiments in which a trench cladding region is directly adjacent to a core region and an outer cladding region is directly adjacent the trench cladding region. The difference between radial position $r_3$ and radial position $r_2=r_1$ is referred to herein as the thickness or width of the trench cladding region. The difference between radial position $r_4$ and radial position $r_3$ is referred to herein as the thickness or width of the outer cladding region.

As will be described further hereinbelow, the relative refractive indices of the core region, offset cladding region, trench cladding region, and outer cladding region differ. Each of the regions is formed from doped or undoped silica glass. Variations in refractive index relative to undoped silica glass are accomplished by incorporating updopants or downdopants at levels designed to provide a targeted refractive index or refractive index profile using techniques known to those of skill in the art. Updopants are dopants that increase the refractive index of the glass relative to the undoped glass composition. Downdopants are dopants that decrease the refractive index of the glass relative to the undoped glass composition. In one embodiment, the undoped glass is pure silica glass. When the undoped glass is pure silica glass, updopants include Cl, Br, Ge, Al, P, Ti, Zr, Nb, and Ta, and downdopants include F and B. Regions of constant refractive index may be formed by not doping (e.g. pure silica) or by doping at a uniform concentration. Regions of variable refractive index are formed through non-uniform spatial distributions of dopants and/or through incorporation of different dopants in different regions. Refractive index varies approximately linearly with the concentration of the updopant or downdopant. For example, each 1 wt % Cl as a dopant in silica glass increases the relative refractive index by about 0.083% and each 1 wt % F as a dopant in silica glass decreases the relative refractive index by about 0.32%.

The coatings formed on glass fibers are formed from curable coating compositions. Curable coating compositions include one or more curable components. As used herein, the term "curable" is intended to mean that the component, when exposed to a suitable source of curing energy, includes one or more curable functional groups capable of forming covalent bonds that participate in linking the component to itself or to other components of the coating composition. The product obtained by curing a curable coating composition is referred to herein as the cured product of the composition. The cured product is preferably a polymer. The curing process is induced by energy. Forms of energy include radiation or thermal energy. In a preferred embodiment, curing occurs with radiation, where radiation refers to electromagnetic radiation. Curing induced by radiation is referred to herein as radiation curing or photocuring. A radiation-curable component is a component that can be induced to undergo a curing reaction when exposed to radiation of a suitable wavelength at a suitable intensity for a sufficient period of time. Suitable wavelengths include wavelengths in the infrared, visible, or ultraviolet portion of the electromagnetic spectrum. The radiation curing reaction occurs in the presence of a photoinitiator. A radiation-curable component may also be thermally curable. Similarly, a thermally curable component is a component that can be induced to undergo a curing reaction when exposed to thermal energy of sufficient intensity for a sufficient period of time. A thermally curable component may also be radiation curable.

A curable component includes one or more curable functional groups. A curable component with only one curable functional group is referred to herein as a monofunctional curable component. A curable component having two or more curable functional groups is referred to herein as a multifunctional curable component. Multifunctional curable components include two or more functional groups capable of forming covalent bonds during the curing process and can introduce crosslinks into the polymeric network formed during the curing process. Multifunctional curable components may also be referred to herein as "crosslinkers" or "curable crosslinkers". Curable components include curable monomers and curable oligomers. Examples of functional groups that participate in covalent bond formation during the curing process are identified hereinafter.

The term "(meth)acrylate" means methacrylate, acrylate, or a combination of methacrylate and acrylate.

Reference will now be made in detail to illustrative embodiments of the present description.

The present description relates to glass fibers and optical fibers having low macrobend loss at bend diameters between 10 mm and 40 mm. Bend diameters greater than 25 mm are commonly encountered when attaching connectors to optical fibers and bend diameters less than 25 mm are commonly encountered when positioning or configuring optical fibers in tight or compact installation spaces. As described herein, macrobend loss at bend diameters over the range from 10 mm to 40 mm can be mitigated through proper design of the refractive index profile of the optical fiber. In particular, inclusion of a trench cladding region between the core region and the cladding region with a large width and shallow depth reduces macrobend loss over a wide range of bend diameters.

One embodiment relates to an optical fiber. An optical fiber includes a glass fiber surrounded by a coating. An example of an optical fiber is shown in schematic cross-sectional view in FIG. 1. Optical fiber 10 includes a glass fiber 11 surrounded by primary coating 16 and secondary coating 18. Further description of glass fiber 11, primary coating 16, and secondary coating 18 is provided below.

Figure 2:
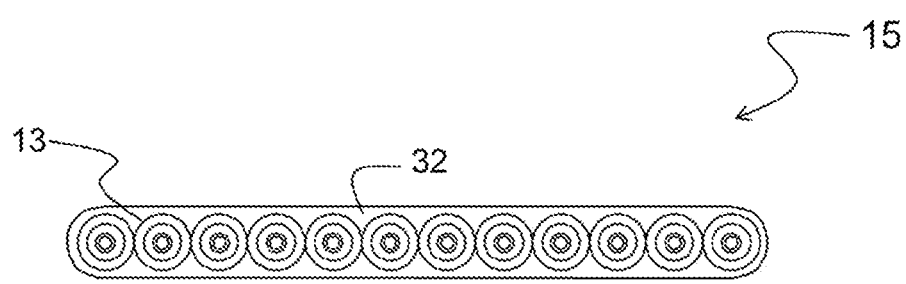
FIG. 2 is a schematic view of a representative optical fiber ribbon.

FIG. 2 illustrates an optical fiber ribbon 15. The ribbon 15 includes a plurality of optical fibers 13 and a matrix 32 encapsulating the plurality of optical fibers. Optical fibers 13 include a core region, a cladding region, a primary coating, and a secondary coating as described above. Optical fibers 13 may also include a tertiary coating. The secondary coating may include a pigment. The optical fibers 13 are aligned relative to one another in a substantially planar and parallel relationship. The optical fibers 13 in fiber optic ribbon 15 are encapsulated by the ribbon matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 15 contains twelve (12) optical fibers 13; however, it should be apparent to those skilled in the art that any number of optical fibers 13 (e.g., two or more) may be employed to form fiber optic ribbon 15 disposed for a particular use. The ribbon matrix 32 can be formed from the same composition used to prepare a secondary coating, or the ribbon matrix 32 can be formed from a different composition that is otherwise compatible for use.

Figure 3:
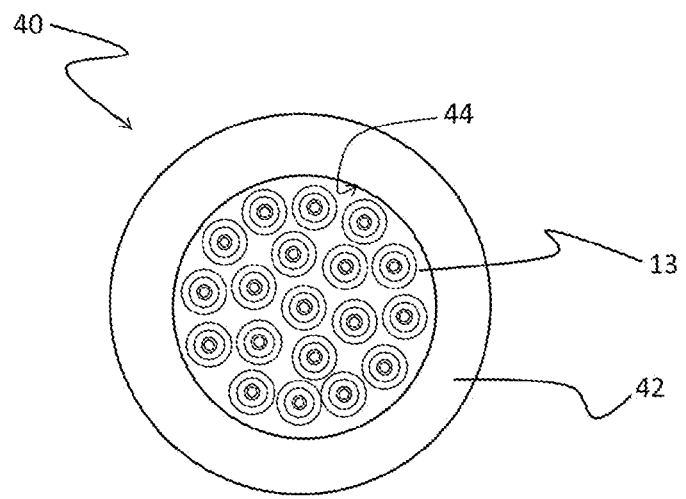
FIG. 3 is a schematic view of a representative optical fiber cable.

FIG. 3 illustrates an optical fiber cable 40. Cable 40 includes a plurality of optical fibers 13 surrounded by jacket 42. Optical fibers 13 may be densely or loosely packed into a conduit enclosed by inner surface 44 of jacket 42. The number of fibers placed in jacket 42 is referred to as the "fiber count" of optical fiber cable 40. The jacket 42 is formed from an extruded polymer material and may include multiple concentric layers of polymers or other materials. Optical fiber cable 40 may include one or more strengthening members (not shown) embedded within jacket 42 or placed within the conduit defined by inner surface 44. Strengthening members include fibers or rods that are more rigid than jacket 42. The strengthening member is made from metal, braided steel, glass-reinforced plastic, fiberglass, or other suitable material. Optical fiber cable 40 may include other layers surrounded by jacket 42 (e.g. armor layers, moisture barrier layers, rip cords, etc.). Optical fiber cable 40 may have a stranded, loose tube core or other fiber optic cable construction.

Glass Fiber. The optical fibers disclosed herein include a glass fiber with a core region and a cladding region surrounding the core region along with a coating surrounding the cladding region. The core region and cladding region are glass. Glass fiber 11 includes a core region 12 and a cladding region 14 (see FIG. 1), as is familiar to the skilled artisan. Core region 12 has a higher refractive index than cladding region 14 and glass fiber 11 functions as a waveguide.

In many applications, the core region and cladding region have a discernible core-cladding boundary. Alternatively, the core region and cladding region can lack a distinct boundary. One type of optical fiber is a step-index optical fiber. Another type of optical fiber is a graded-index optical fiber, which has a core region with a refractive index that varies with radial position from the centerline (r=0) of the optical fiber. Examples of graded-index optical fibers are optical fibers with a core region having a relative refractive index profile characterized by the α-profile defined by Eq. (3) above.

Figure 4A:
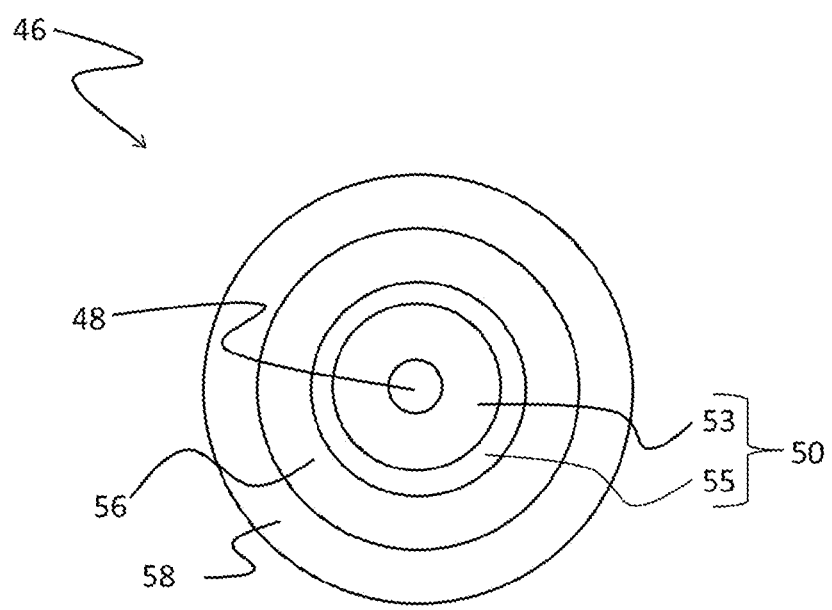
FIG. 4A depicts a cross-sectional view of an optical fiber having a core region, a trench cladding region, an outer cladding region, a primary coating, and a secondary coating.
Figure 4B:
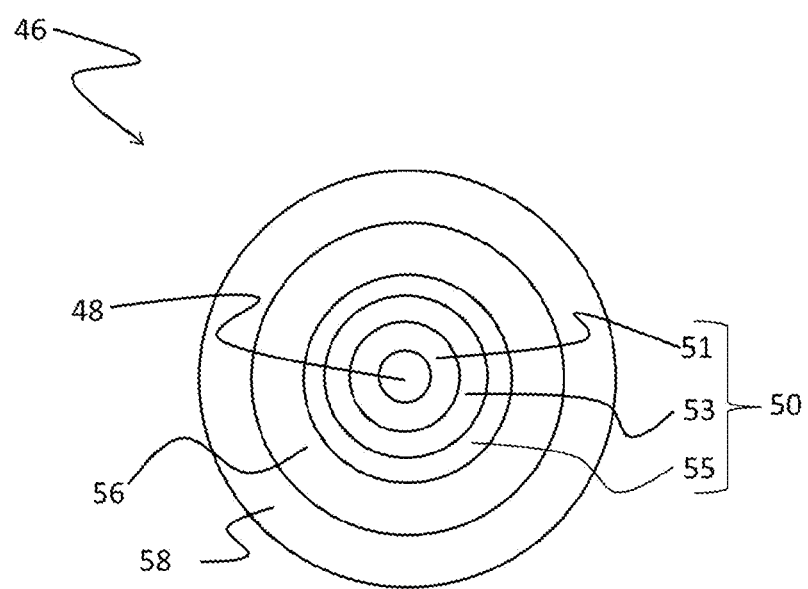
FIG. 4B depicts a cross-sectional view of an optical fiber having a core region, an offset cladding region, a trench cladding region, an outer cladding region, a primary coating, and a secondary coating.

Schematic cross-sectional depictions of an optical fiber are shown in FIGS. 4A and 4B. In FIG. 4A, optical fiber 46 includes core region 48, cladding region 50, primary coating 56, and secondary coating 58. Cladding region 50 includes trench cladding region 53 and outer cladding region 55. In FIG. 4B, optical fiber 46 includes core region 48, cladding region 50, primary coating 56, and secondary coating 58. Cladding region 50 includes offset cladding region 51, trench cladding region 53, and outer cladding region 55.

In one embodiment (e.g. FIG. 4A), the optical fiber includes a trench cladding region surrounding a core, an outer cladding region surrounding the trench cladding region, a primary coating surrounding the outer cladding region, and a secondary coating surrounding the primary coating. The trench cladding region is directly adjacent to the core region, the outer cladding region is directly adjacent to the trench cladding region, the primary coating is directly adjacent to the outer cladding region, and the secondary coating is directly adjacent to the primary coating. A tertiary layer (e.g. ink layer) optionally surrounds or is directly adjacent to the secondary coating in the foregoing embodiment.

In another embodiment (e.g. FIG. 4B), the optical fiber includes an offset cladding region surrounding a core, a trench cladding region surrounding the offset cladding region, an outer cladding region surrounding the trench cladding region, a primary coating surrounding the outer cladding region, and a secondary coating surrounding the primary coating. The offset cladding region is directly adjacent to the core region, the trench cladding region is directly adjacent to the offset cladding region, the outer cladding region is directly adjacent to the trench cladding region, the primary coating is directly adjacent to the outer cladding region, and the secondary coating is directly adjacent to the primary coating. A tertiary layer (e.g. ink layer) optionally surrounds or is directly adjacent to the secondary coating in the foregoing embodiment.

Representative relative refractive index profiles for a glass fiber are presented in FIGS. 5A-5D.

Figure 5A:
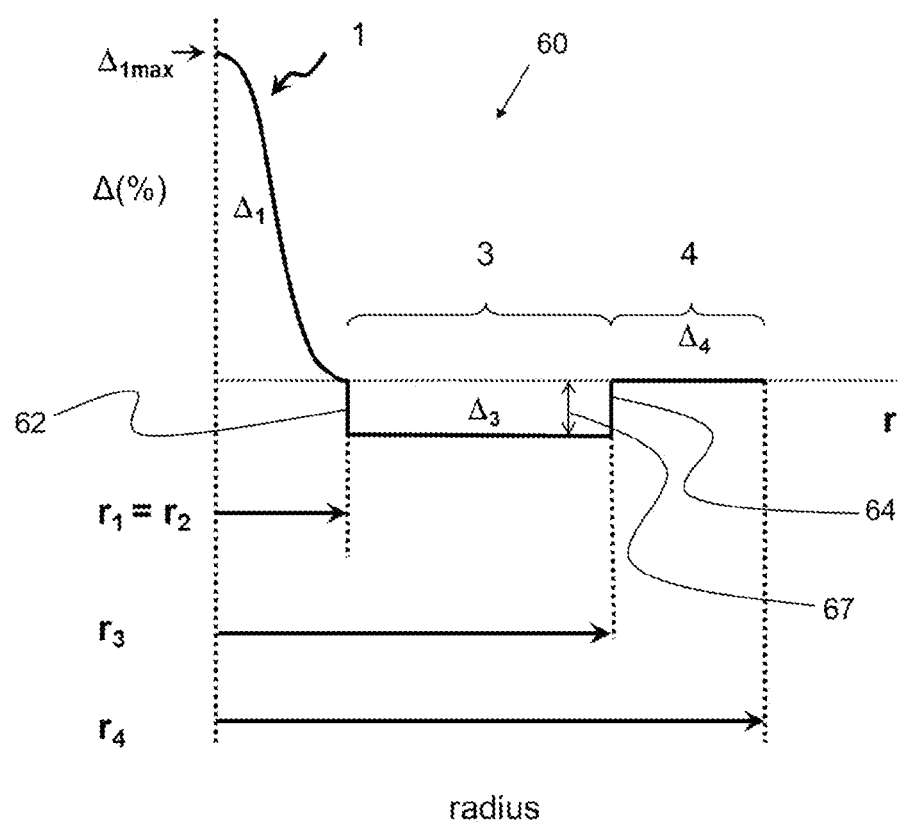
FIG. 5A depicts a relative refractive index profile of a glass fiber having a core region, a trench cladding region, and an outer cladding region.

FIG. 5A shows a graded index profile for a glass fiber 60 having a core region (1) with outer radius $r_1$ and relative refractive index $\Delta_1$ with maximum relative refractive index $\Delta_{1max}$, a trench cladding region (3) extending from radial position $r_2=r_1$ to radial position $r_3$ and having relative refractive index $\Delta_3$, and an outer cladding region (4) extending from radial position $r_3$ to radial position $r_4$ and having relative refractive index $\Delta_4$. In the embodiment of FIG. 5A, relative refractive index $\Delta_3$ is constant or approximately constant from inner radius $r_2$ of the trench cladding region (3) to the outer radius $r_3$ of the trench cladding region (3).

Figure 5B:
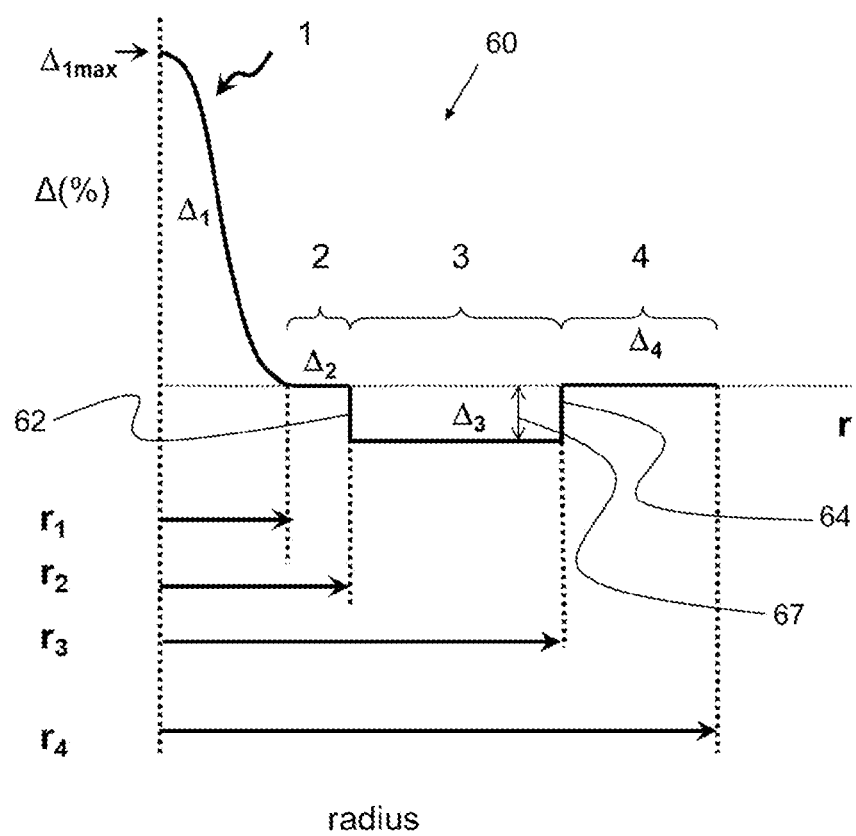
FIG. 5B depicts a relative refractive index profile of a glass fiber having a core region, an offset cladding region, a trench cladding region, and an outer cladding region.

FIG. 5B shows a graded index profile for a glass fiber 60 having a core region (1) with outer radius $r_1$ and relative refractive index $\Delta_1$ with maximum relative refractive index $\Delta_{1max}$, an offset cladding region (2) extending from radial position $r_1$ to radial position $r_2>r_1$ and having relative refractive index $\Delta_2$, a trench cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the embodiment of FIG. 5B, relative refractive index $\Delta_3$ is constant or approximately constant from inner radius $r_2$ of the trench cladding region (3) to the outer radius $r_3$ of the trench cladding region (3).

Figure 5C:
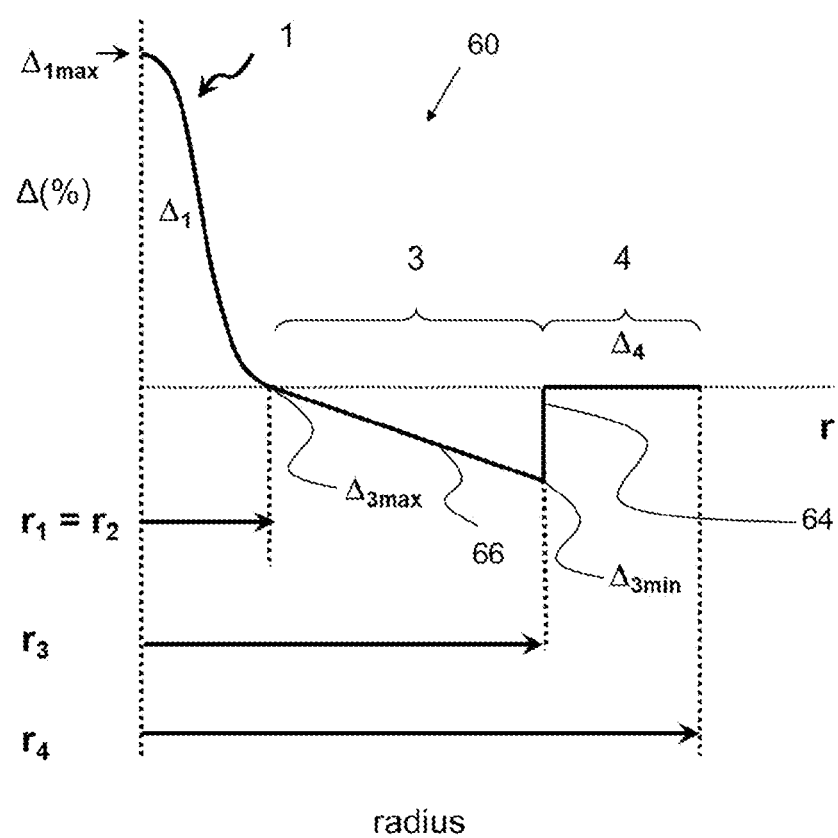
FIG. 5C depicts a relative refractive index profile of a glass fiber having a core region, a trench cladding region, and an outer cladding region.

FIG. 5C shows a graded index profile for a glass fiber 60 having a core region (1) with outer radius $r_1$ and relative refractive index $\Delta_1$ with maximum relative refractive index $\Delta_{1max}$, a trench cladding region (3) extending from radial position $r_2=r_1$ to radial position $r_3$ and having relative refractive index $\Delta_3$, and an outer cladding region (4) extending from radial position $r_3$ to radial position $r_4$ and having relative refractive index $\Delta_4$. In the embodiment of FIG. 5C, relative refractive index $\Delta_3$ is monotonically decreasing with a constant or approximately constant slope from a maximum value $\Delta_{3max}$ at inner radius $r_2$ of the trench cladding region (3) to a minimum value $\Delta_{3min}$ at the outer radius $r_3$ of the trench cladding region (3).

Figure 5D:
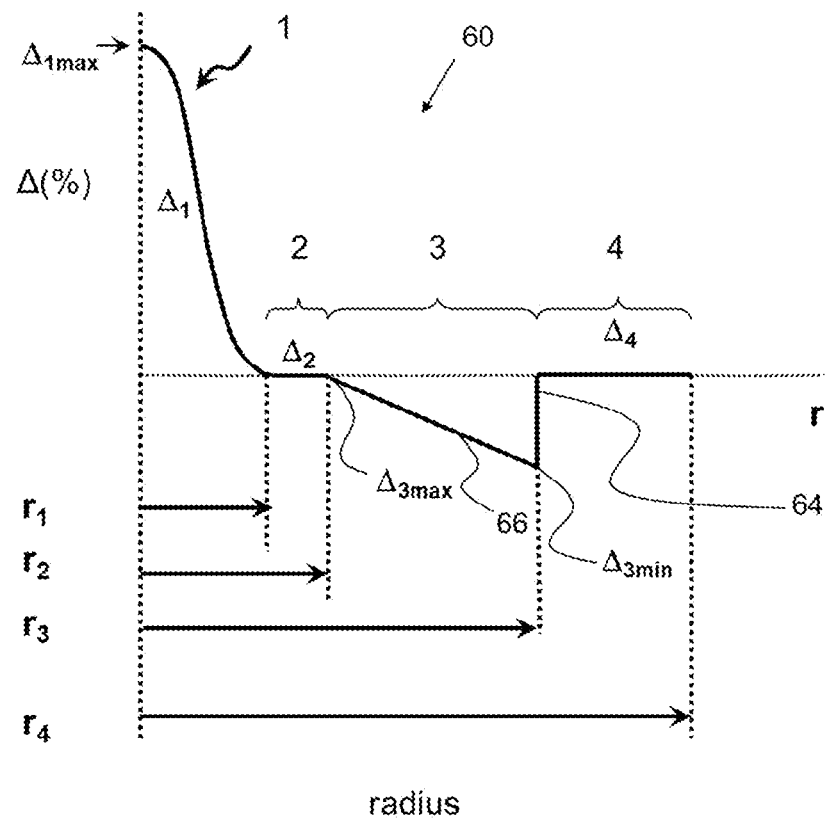
FIG. 5D depicts a relative refractive index profile of a glass fiber having a core region, an offset cladding region, a trench cladding region, and an outer cladding region.

FIG. 5D shows a graded index profile for a glass fiber 60 having a core region (1) with outer radius $r_1$ and relative refractive index $\Delta_1$ with maximum relative refractive index $\Delta_{1max}$, an offset cladding region (2) extending from radial position $r_1$ to radial position $r_2>r_1$ and having relative refractive index $\Delta_2$, a trench cladding region (3) extending from radial position $r_2$ to radial position $r_3$ and having relative refractive index $\Delta_3$, and an outer cladding region (4) extending from radial position $r_3$ to radial position $r_4$ and having relative refractive index $\Delta_4$. In the embodiment of FIG. 5D, relative refractive index $\Delta_3$ is monotonically decreasing with a constant or approximately constant slope from a maximum value $\Delta_{3max}$ at inner radius $r_2$ of the trench cladding region (3) to a minimum value $\Delta_{3min}$ at the outer radius $r_3$ of the trench cladding region (3).

In the profiles of FIGS. 5A and 5B, the trench cladding region (3) has a constant or average relative refractive index $\Delta_3$ that is less than the relative refractive index $\Delta_4$ of the outer cladding region (4). In the profiles of FIGS. 5C and 5D, the trench cladding region (3) has a minimum relative refractive index $\Delta_{3min}$ that is less than the relative refractive index $\Delta_4$ of the outer cladding region (4). Core region (1) has the highest average and highest maximum relative refractive index in the profile. Core region (1) may include a lower index region at or near the centerline (known in the art as a "centerline dip") (not shown).

In the embodiments shown in FIGS. 5A-5D, the core region (1) of the glass fiber has a relative refractive index described by an α-profile. The radial position $r_0$ (corresponding to $\Delta_{1max}$) of the α-profile corresponds to the centerline (r=0) of the fiber and the radial position $r_z$ of the α-profile corresponds to the core radius $r_1$. In embodiments with a centerline dip, the radial position $r_0$ is slightly offset from the centerline of the fiber (not shown). In other embodiments, core region (1) shown in FIGS. 5A-5D is a step index relative refractive index profile instead of an α-profile. In still other embodiments, core region (1) has a relative refractive index profile not defined by any of an α-profile or a step-index profile. In some embodiments, the relative refractive index $\Delta_1$ continuously decreases in the radial direction away from the centerline. In other embodiments, relative refractive index $\Delta_1$ varies over some radial positions between the centerline and $r_1$, and also includes a constant or approximately constant value over other radial positions between the centerline and $r_1$.

In FIG. 5A, transition region 62 from core region (1) to trench cladding region (3) and transition region 64 from trench cladding region (3) to outer cladding region (4) are shown as step changes. In FIG. 5B, transition region 62 from offset cladding region (2) to trench cladding region (3) and transition region 64 from trench cladding region (3) to outer cladding region (4) are shown as step changes. In FIGS. 5C and 5D, transition region 64 from trench cladding region (3) to outer cladding region (4) are shown as step changes. It is to be understood that a step change is an idealization and that transition region 62 and transition region 64 may not be strictly vertical in practice. Instead, transition region 62 and/or transition region 64 may have a slope or curvature. When transition region 62 and/or transition region 64 are non-vertical, the inner radius ($r_2$) and outer radius ($r_3$) of trench cladding region (3) correspond to the mid-points of transition regions 62 and 64, respectively. The mid-points correspond to half of the depth 67 (FIGS. 5A and 5B) or half the depth of the minimum relative refractive index $\Delta_{3min}$ (FIGS. 5C and 5D) of the trench cladding region (3), where depth 67 or the depth of the minimum relative refractive index $\Delta 3$ min is defined relative to relative refractive index $\Delta_4$ of the outer cladding region (4).

The relative ordering of relative refractive indices $\Delta_1$, $\Delta_3$, and $\Delta_4$ in the relative refractive index profile shown in FIGS. 5A and 5B satisfy the condition $\Delta_{1max}>\Delta_4>\Delta_3$. The relative ordering of relative refractive indices $\Delta_1$, $\Delta_{3min}$, and $\Delta_4$ in the relative refractive index profile shown in FIGS. 5C and 5D satisfy the condition $\Delta_{1max}>\Delta_4>\Delta_{3min}$.

The core region comprises silica glass. The silica glass of the core region is undoped silica glass, updoped silica glass, and/or downdoped silica glass. In one embodiment, the silica glass of the core region is Ge-free; that is the core region comprises silica glass that lacks Ge. In another embodiment, the core region comprises silica glass doped with germanium dioxide ($GeO_2$). Embodiments of updoped silica glass include silica glass doped with an alkali metal oxide (e.g. $Na_2O$, $K_2O$, $Li_2O$, $Cs_2O$, or $Rb_2O$) and/or a halogen (Cl or Br). Downdoped silica glass includes silica glass doped with F.

In some embodiments, the core region includes an updopant and a downdopant, where the concentration of updopant is highest at the centerline (r=0) (in embodiments without a centerline dip) or near the centerline (r=0) (in embodiments with a centerline dip) and lowest at the radius $r_1$ and the concentration of downdopant is lowest at the centerline (r=0) and highest at the radius $r_1$. In such embodiments, the relative refractive index $\Delta_1$ can have a positive value near the centerline (r=0) and decrease to a negative value at the radius $r_1$.

In some embodiments, the relative refractive index of the core region of the glass fiber is described by an α-profile with an α value in the range from 1.5 to 10, or in the range from 1.7 to 8.0, or in the range from 1.8 to 6.0, or in the range from 1.9 to 5.0, or in the range from 1.95 to 4.5, or in the range from 2.0 to 4.0, or in the range from 10 to 100, or in the range from 11 to 40, or in the range from 12 to 30. As the value of α increases, the relative refractive profile more closely approaches a step index profile. For purposes of the present disclosure, an α-profile with an α value greater than or equal to 10 is regarded as a step index profile.

The outer radius $r_1$ of the core region is in the range from 4.0 μm to 8.0 μm, or in the range from 4.5 μm to 7.5 μm, or in the range from 5.0 μm to 7.0 μm. In embodiments without an offset cladding region, the inner radius of the trench cladding region is $r_2=r_1$ and has the values listed for $r_1$ above.

The relative refractive index $\Delta_1$ or $\Delta_{1max}$ of the core region is in the range from 0.20% to 0.50%, or in the range from 0.25% to 0.45%, or in the range from 0.30% to 0.40. The minimum relative refractive index $\Delta_{1min}$ of the core region is in the range from −0.10% to 0.10%, or in the range from −0.05% to 0.05%, or in the range from −0.02% to 0.02%.

In some embodiments, the relative refractive index of the core region is described by a step-index profile having a constant or approximately constant value corresponding to $\Delta_{1max}$ that extends over at least 70%, or at least 80%, or at least 90% of the distance between the centerline of the optical fiber (r=0) and the outer radius $r_1$.

In some embodiments, the cladding includes an offset cladding region directly adjacent the core region and a trench cladding region directly adjacent the offset cladding region. In these embodiments, the offset cladding region has an inner radius $r_1$ as defined above and an outer radius $r_2>r_1$. In these embodiments, the outer radius $r_2$ of the offset cladding region is in the range from 6.0 μm to 10.0 μm, or in the range from 6.5 μm to 9.5 μm, or in the range from 7.0 μm to 9.0 μm. The thickness $r_2-r_1$ of the offset cladding region is in the range from 0.5 μm to 5.0 μm, or in the range from 1.0 μm to 4.5 μm, or in the range from 1.5 μm to 4.0 μm, or in the range from 2.0 μm to 3.5 μm. The relative refractive index $\Delta_2$ of the offset cladding region is in the range from −0.10% to 0.10%, or in the range from −0.05% to 0.05%, or in the range from −0.02% to 0.02%.

The trench cladding region comprises downdoped silica glass. The preferred downdopant is F (fluorine). The relative refractive index $\Delta_3$ or $\Delta_{3min}$ of the trench cladding region is greater than −0.30% and/or less than 0.00%, or greater than −0.025% and/or less than 0.00%, or greater than −0.20% and/or less than 0.00%, or greater than −0.15% and/or less than 0.00%, or in the range from −0.05% to −0.30%, or in the range from −0.10% to −0.25%, or in the range from −0.10% to −0.20% or in the range from −0.15% to −0.30%, or in the range from −0.15% to −0.25%. In some embodiments, the relative refractive index $\Delta_3$ is constant or approximately constant, and in other embodiments, the relative refractive index $\Delta_3$ decreases monotonically from inner radius $r_2$ to outer radius $r_3$. In a preferred embodiment, the monotonic decrease in $\Delta_3$ exhibits a constant or approximately constant slope. In such embodiments, the trench cladding region is referred to herein as a triangular trench. The monotonic decrease in $\Delta_3$ extends from a maximum value $\Delta_{3max}$ at or near inner radius $r_2$ to a minimum value $\Delta_{3min}$ at or near outer radius $r_3$. The relative refractive index $\Delta_{3max}$ is in the range from −0.10% to 0.10%, or in the range from −0.05% to 0.05%, or in the range from −0.02% to 0.02%. In one embodiment, relative refractive index $\Delta_{3max}$ is equal or approximately equal to the relative refractive index $\Delta_{1min}$. In another embodiment, the relative refractive index $\Delta_{3max}$ is equal or approximately equal to the relative refractive index $\Delta_2$. The relative refractive index $\Delta_{3min}$ is in the range from −0.10% to −0.30%, or in the range from −0.10% to −0.25%, or in the range from −0.10% to −0.20% or in the range from −0.15% to −0.30%, or in the range from −0.15% to −0.25%.

The inner radius of the trench cladding region is $r_2=r_1$ (in embodiments without an offset cladding region) or $r_2>r_1$ (in embodiments with an offset cladding region) and has the values specified above. The outer radius $r_3$ of the trench cladding region is in the range from 17.0 μm to 30.0 μm, or in the range from 18.0 μm to 28.0 μm, or in the range from 19.0 μm to 26.0 μm, or in the range from 20.0 μm to 26.0 μm, or in the range from 21.0 μm to 24.0 μm, or greater than 18.0 μm, or greater than 19.0 μm, or greater than 20.0 μm, or greater than 21.0 μm, or greater than 22.0 μm, or greater than 23.0 μm, or greater than 24.0 μm. The thickness $r_3-r_2$ of the trench cladding region is greater than 10.0 μm, or greater than 11.0 μm, or greater than 12.0 μm, or greater than 13.0 μm, or greater than 14.0 μm, or greater than 15.0 μm, or greater than 16.0 μm, or in the range from 10.0 μm to 20.0 μm, or in the range from 11.0 μm to 18.0 lam, or in the range from 12.0 μm to 17.0 μm.

The trench cladding region has a trench volume greater than 30% μm², or greater than 35% μm², or greater than 40% μm², or greater than 45% μm², or greater than 50% μm², or greater than 55% μm², or in the range from 30%μm² to 60% μm², or in the range from 35%μm² to 55% μm², or in the range from 40% μm² to 50% μm². Trench volume can be controlled by varying the thickness $r_3-r_2$ of the trench cladding region, the relative refractive index (43, $\Delta_3$ mm, and/or $\Delta_{3max}$) of the trench cladding region and/or the difference between the relative refractive index of the outer cladding region ($\Delta_4$) and the relative refractive index of the trench cladding region ($\Delta_3$, $\Delta_{3min}$, and/or $\Delta_{3max}$).

In some embodiments, the relative refractive index $\Delta_3$ or $\Delta_{3min}$ of the trench cladding region is greater than −0.30% and the thickness $r_3-r_2$ of the trench cladding region is greater than 10.0 μm, or greater than 11.0 μm, or greater than 12.0 μm, or greater than 13.0 μm, or greater than 14.0 μm, or greater than 15.0 μm, or greater than 16.0 μm, or in the range from 10.0 lam to 20.0 μm, or in the range from 11.0 μm to 18.0 μm, or in the range from 12.0 μm to 17.0 μm.

In some embodiments, the relative refractive index $\Delta_3$ or $\Delta_{3min}$ of the trench cladding region is greater than −0.25% and the thickness $r_3-r_2$ of the trench cladding region is greater than 10.0 μm, or greater than 11.0 μm, or greater than 12.0 μm, or greater than 13.0 μm, or greater than 14.0 μm, or greater than 15.0 μm, or greater than 16.0 μm, or in the range from 10.0 lam to 20.0 μm, or in the range from 11.0 μm to 18.0 μm, or in the range from 12.0 μm to 17.0 μm.

In some embodiments, the relative refractive index $\Delta_3$ or $\Delta_{3min}$ of the trench cladding region is greater than −0.20% and the thickness $r_3-r_2$ of the trench cladding region is greater than 10.0 μm, or greater than 11.0 μm, or greater than 12.0 μm, or greater than 13.0 μm, or greater than 14.0 μm, or greater than 15.0 μm, or greater than 16.0 μm, or in the range from 10.0 lam to 20.0 µm, or in the range from 11.0 µm to 18.0 µm, or in the range from 12.0 µm to 17.0 µm.

In some embodiments, the relative refractive index $\Delta_3$ or $\Delta_{3min}$ of the trench cladding region is in the range from −0.10% to −0.25% and the thickness $r_3-r_2$ of the trench cladding region is greater than 10.0 µm, or greater than 11.0 µm, or greater than 12.0 µm, or greater than 13.0 µm, or greater than 14.0 µm, or greater than 15.0 µm, or greater than 16.0 µm, or in the range from 10.0 µm to 20.0 µm, or in the range from 11.0 µm to 18.0 µm, or in the range from 12.0 µm to 17.0 µm.

In some embodiments, the relative refractive index $\Delta_3$ or $\Delta_{3min}$ of the trench cladding region is greater than −0.30% and the trench volume is greater than 30% µm$^2$, or greater than 35% µm$^2$, or greater than 40% µm$^2$, or greater than 45% µm$^2$, or greater than 50% µm$^2$, or greater than 55% µm$^2$, or in the range from 30% µm$^2$ to 60% µm$^2$, or in the range from 35% µm$^2$ to 55% µm$^2$, or in the range from 40% µm$^2$ to 50% µm$^2$.

In some embodiments, the relative refractive index $\Delta_3$ or $\Delta_{3min}$ of the trench cladding region is greater than −0.25% and the trench volume is greater than 30% µm$^2$, or greater than 35% µm$^2$, or greater than 40% µm$^2$, or greater than 45% µm$^2$, or greater than 50% µm$^2$, or greater than 55% µm$^2$, or in the range from 30% µm$^2$ to 60% µm$^2$, or in the range from 35% µm$^2$ to 55% µm$^2$, or in the range from 40% µm$^2$ to 50% µm$^2$.

In some embodiments, the relative refractive index $\Delta_3$ or $\Delta_{3min}$ of the trench cladding region is greater than −0.20% and the trench volume is greater than 30% µm$^2$, or greater than 35% µm$^2$, or greater than 40% µm$^2$, or greater than 45% µm$^2$, or greater than 50% µm$^2$, or greater than 55% µm$^2$, or in the range from 30% µm$^2$ to 60% µm$^2$, or in the range from 35% µm$^2$ to 55% µm$^2$, or in the range from 40% µm$^2$ to 50% µm$^2$.

The relative refractive index $\Delta_4$ or $\Delta_{4max}$ of the outer cladding region is in the range from −0.10% to 0.10%, or in the range from −0.05% to 0.05%, or in the range from −0.02% to 0.02%. The relative refractive index $\Delta_4$ is preferably constant or approximately constant.

The inner radius of the outer cladding region is $r_3$ and has the values specified above. The outer radius $r_4$ of the outer cladding region is in the range from 57.5 µm to 67.5 µm, or in the range from 60.0 µm to 65.0 µm, or in the range from 61.0 µm to 64.0 µm, or about 62.5 µm. The thickness $r_4-r_3$ of the outer cladding region is in the range from 20.0 µm to 50.0 µm, or in the range from 25.0 µm to 45.0 µm, or in the range from 30.0 µm to 40.0 µm.

Optical Fiber Coatings. The transmissivity of light through an optical fiber is highly dependent on the properties of the coatings applied to the glass fiber. The coatings typically include a primary coating and a secondary coating, where the secondary coating surrounds the primary coating and the primary coating contacts the glass fiber (which includes a central core region surrounded by a cladding region). The secondary coating is a harder material (higher Young's modulus (e.g. greater than 1400 MPa) than the primary coating and is designed to protect the glass fiber from damage caused by abrasion or external forces that arise during processing, handling, and installation of the optical fiber. The primary coating is a softer material (lower Young's modulus (e.g. less than 1 MPa) than the secondary coating and is designed to buffer or dissipates stresses that result from forces applied to the outer surface of the secondary coating. Dissipation of stresses within the primary coating attenuates the stress and minimizes the stress that reaches the glass fiber. The primary coating is especially important in dissipating stresses that arise due to the microbends that the optical fiber encounters when deployed in a cable. The microbending stresses transmitted to the glass fiber need to be minimized because microbending stresses create local perturbations in the refractive index profile of the glass fiber. The local refractive index perturbations lead to intensity losses for the light transmitted through the glass fiber. By dissipating stresses, the primary coating minimizes microbend-induced intensity losses The primary coating 16 preferably has a higher refractive index than the cladding region of the glass fiber in order to allow it to strip errant optical signals away from the core region. The primary coating should maintain adequate adhesion to the glass fiber during thermal and hydrolytic aging, yet be strippable from the glass fiber for splicing purposes.

Primary and secondary coatings are typically formed by applying a curable coating composition to the glass fiber as a viscous liquid and curing. The optical fiber may also include a tertiary coating (not shown) that surrounds the secondary coating. The tertiary coating may include pigments, inks or other coloring agents to mark the optical fiber for identification purposes and typically has a Young's modulus similar to the Young's modulus of the secondary coating.

Primary Coating Compositions. The primary coating is a cured product of a curable primary coating composition. The curable primary coating compositions provide a primary coating for optical fibers that exhibits low Young's modulus, low pullout force, and strong cohesion. The curable primary coating compositions further enable formation of a primary coating that features clean strippability and high resistance to defect formation during the stripping operation. Low pullout force facilitates clean stripping of the primary coating with minimal residue and strong cohesion inhibits initiation and propagation of defects in the primary coating when it is subjected to stripping forces.

The primary coating is a cured product of a radiation-curable primary coating composition that includes an oligomer, a monomer, a photoinitiator and, optionally, an additive. The following disclosure describes oligomers for the radiation-curable primary coating compositions, radiation-curable primary coating compositions containing at least one of the oligomers, cured products of the radiation-curable primary coating compositions that include at least one of the oligomers, glass fibers coated with a radiation-curable primary coating composition containing at least one of the oligomers, and glass fibers coated with the cured product of a radiation-curable primary coating composition containing at least one of the oligomers.

The oligomer preferably includes a polyether urethane diacrylate compound or a combination of a polyether urethane diacrylate compound and a di-adduct compound. In one embodiment, the polyether urethane diacrylate compound has a linear molecular structure. In one embodiment, the oligomer is formed from a reaction between a diisocyanate compound, a polyol compound, and a hydroxy acrylate compound, where the reaction produces a polyether urethane diacrylate compound as a primary product (majority product) and a di-adduct compound as a byproduct (minority product). The reaction forms a urethane linkage upon reaction of an isocyanate group of the diisocyanate compound and an alcohol group of the polyol. The hydroxy acrylate compound reacts to quench residual isocyanate groups that are present in the composition formed from reaction of the diisocyanate compound and polyol compound. As used herein, the term "quench" refers to conversion of isocyanate groups through a chemical reaction with hydroxyl groups of the hydroxy acrylate compound. Quenching of residual isocyanate groups with a hydroxy acrylate compound converts terminal isocyanate groups to terminal acrylate groups.

The diisocyanate compound, hydroxy acrylate compound and polyol are combined simultaneously and reacted, or are combined sequentially (in any order) and reacted. In one embodiment, the oligomer is formed by reacting a diisocyanate compound with a hydroxy acrylate compound and reacting the resulting product composition with a polyol. In another embodiment, the oligomer is formed by reacting a diisocyanate compound with a polyol compound and reacting the resulting product composition with a hydroxy acrylate compound.

The oligomer is formed from a reaction of a diisocyanate compound, a hydroxy acrylate compound, and a polyol, where the molar ratio of the diisocyanate compound to the hydroxy acrylate compound to the polyol in the reaction process is n:m:p. n, m, and p are referred to herein as mole numbers or molar proportions of diisocyanate, hydroxy acrylate, and polyol; respectively. The mole numbers n, m and p are positive integer or positive non-integer numbers. In embodiments, when p is 2.0, n is in the range from 3.0 to 5.0, or in the range from 3.2 to 4.8, or in the range from 3.4 to 4.6, or in the range from 3.5 to 4.4, or in the range from 3.6 to 4.2, or in the range from 3.7 to 4.0; and m is in the range from 1.5 to 4.0, or in the range from 1.6 to 3.6, or in the range from 1.7 to 3.2, or in the range from 1.8 to 2.8, or in the range from 1.9 to 2.4. For values of p other than 2.0, the molar ratio n:m:p scales proportionally. For example, the molar ratio n:m:p=4.0:3.0:2.0 is equivalent to the molar ratio n:m:p=2.0:1.5:1.0.

The curable primary coating composition further includes one or more monomers. The one or more monomers is/are selected to be compatible with the oligomer, to control the viscosity of the primary coating composition to facilitate processing, and/or to influence the physical or chemical properties of the coating formed as the cured product of the primary coating composition. The monomers include radiation-curable monomers such as ethylenically-unsaturated compounds, ethoxylated acrylates, ethoxylated alkylphenol monoacrylates, propylene oxide acrylates, n-propylene oxide acrylates, isopropylene oxide acrylates, monofunctional acrylates, monofunctional aliphatic epoxy acrylates, multifunctional acrylates, multifunctional aliphatic epoxy acrylates, and combinations thereof.

Representative radiation-curable ethylenically unsaturated monomers include alkoxylated monomers with one or more acrylate or methacrylate groups. An alkoxylated monomer is one that includes one or more alkoxylene groups, where an alkoxylene group has the form —O—R— and R is a linear or branched alkylene group. Examples of alkoxylene groups include ethoxylene (—O—CH$_2$—CH$_2$—), n-propoxylene (—O—CH$_2$—CH$_2$—CH$_2$—), isopropoxylene (—O—CH$_2$—CH(CH$_3$)—, or —O—CH(CH$_3$)—CH$_2$—), etc. As used herein, the degree of alkoxylation refers to the number of alkoxylene groups in the monomer. In one embodiment, the alkoxylene groups are bonded consecutively in the monomer.

In some embodiments, the primary coating composition includes an alkoxylated monomer of the form R$_4$—R$_5$—O—(CH(CH$_3$)CH$_2$—O)$_q$—C(O)CH=CH$_2$, where R$_4$ and R$_5$ are aliphatic, aromatic, or a mixture of both, and q=1 to 10, or R$_4$—O—(CH(CH$_3$)CH$_2$—O)$_q$—C(O)CH=CH$_2$, where C(O) is a carbonyl group, R$_1$ is aliphatic or aromatic, and q=1 to 10.

In some embodiments, the monomer component of the primary coating composition includes a multifunctional (meth)acrylate. Multifunctional ethylenically unsaturated monomers include multifunctional acrylate monomers and multifunctional methacrylate monomers. Multifunctional acrylates are acrylates having two or more polymerizable acrylate moieties per molecule, or three or more polymerizable acrylate moieties per molecule.

In some embodiments, the primary coating composition includes an N-vinyl amide monomer such as an N-vinyl lactam, or N-vinyl pyrrolidinone, or N-vinyl caprolactam.

In addition to a curable monomer and a curable oligomer, the curable primary coating composition also includes a polymerization initiator. The polymerization initiator facilitates initiation of the polymerization process associated with the curing of the coating composition to form the coating. Polymerization initiators include thermal initiators, chemical initiators, electron beam initiators, and photoinitiators. Photoinitiators include ketonic photoinitiators and/or phosphine oxide photoinitiators. When used in the curing of the coating composition, the photoinitiator is present in an amount sufficient to enable rapid radiation curing.

The curable primary coating composition optionally includes one or more additives. Additives include an adhesion promoter, a strength additive, an antioxidant, a catalyst, a stabilizer, an optical brightener, a property-enhancing additive, an amine synergist, a wax, a lubricant, and/or a slip agent. Some additives operate to control the polymerization process, thereby affecting the physical properties (e.g., modulus, glass transition temperature) of the polymerization product formed from the coating composition. Other additives affect the integrity of the cured product of the primary coating composition (e.g., protect against de-polymerization or oxidative degradation).

Secondary Coating—Compositions. The secondary coating is a cured product of a curable secondary coating composition that includes a monomer, a photoinitiator, an optional oligomer, and an optional additive. The present disclosure describes optional oligomers for the radiation-curable secondary coating compositions, radiation-curable secondary coating compositions, cured products of the radiation-curable secondary coating compositions, optical fibers coated with a radiation-curable secondary coating composition, and optical fibers coated with the cured product of a radiation-curable secondary coating composition.

The secondary coating is formed as the cured product of a radiation-curable secondary coating composition that includes a monomer component with one or more monomers. The monomers preferably include ethylenically unsaturated compounds. In one embodiment, the secondary coating is the radiation-cured product of a secondary coating composition that contains urethane acrylate monomers.

The monomers include functional groups that are polymerizable groups and/or groups that facilitate or enable cross-linking. The monomers are monofunctional monomers or multifunctional monomers. In combinations of two or more monomers, the constituent monomers are monofunctional monomers, multifunctional monomers, or a combination of monofunctional monomers and multifunctional monomers. In one embodiment, the monomer component of the curable secondary coating composition includes ethylenically unsaturated monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

In one embodiment, the monomer component of the curable secondary coating composition includes ethylenically unsaturated monomers. The monomers include functional groups that are polymerizable groups and/or groups that facilitate or enable crosslinking. The monomers are monofunctional monomers or multifunctional monomers. In combinations of two or more monomers, the constituent monomers are monofunctional monomers, multifunctional monomers, or a combination of monofunctional monomers and multifunctional monomers. Suitable functional groups for ethylenically unsaturated monomers include, without limitation, (meth)acrylates, acrylamides, N-vinyl amides, styrenes, vinyl ethers, vinyl esters, acid esters, and combinations thereof.

Representative radiation-curable ethylenically unsaturated monomers included alkoxylated monomers with one or more acrylate or methacrylate groups. An alkoxylated monomer is one that includes one or more alkoxylene groups, where an alkoxylene group has the form —O—R— and R is a linear or branched hydrocarbon. Examples of alkoxylene groups include ethoxylene (—O—$CH_2$—$CH_2$—), n-propoxylene (—O—$CH_2$—$CH_2$—$CH_2$—), iso-propoxylene (—O—$CH_2$—$CH(CH_3)$—), etc. As used herein, the degree of alkoxylation refers to the number of alkoxylene groups in the monomer. In one embodiment, the alkoxylene groups are bonded consecutively in the monomer.

Multifunctional ethylenically unsaturated monomers for the curable secondary coating composition include, without limitation, alkoxylated bisphenol A diacrylates, such as ethoxylated bisphenol A diacrylate, with the degree of alkoxylation being 2 or greater. The monomer component of the secondary coating composition may include ethoxylated bisphenol A diacrylate with a degree of ethoxylation ranging from 2 to about 30 or propoxylated bisphenol A diacrylate with the degree of propoxylation being 2 or greater; for example, ranging from 2 to about 30; methylolpropane polyacrylates with and without alkoxylation such as ethoxylated trimethylolpropane triacrylate with the degree of ethoxylation being 3 or greater.

The curable secondary coating composition also includes a photoinitiator and optionally includes additives such as anti-oxidant(s), optical brightener(s), amine synergist(s), tackifier(s), catalyst(s), a carrier or surfactant, and a stabilizer as described above in connection with the curable primary coating composition.

Optical Fiber Preform. In production, optical fibers are drawn from preforms. The preform is a dense glass monolith with a typical diameter of about 27 cm and a typical length of about 200 cm. The preform includes a central core region surrounded by an annular cladding region. The composition of the core and cladding regions of the preform correspond to the compositions of the core and cladding regions of an optical fiber drawn from the preform. The diameter of the core region of the preform and the thickness of the cladding region of the preform are in proportion to the core diameter and cladding thickness of an optical fiber drawn from the preform. The core region and/or cladding region of the preform may include multiple concentric layers that differ in dopant type or dopant concentration to provide optical fibers having a desired refractive index profile, such as the relative refractive index profiles described herein.

Silica and doped silica for the core and cladding regions of an optical fiber preform can be produced by methods known in the art. Suitable methods include flame combustion methods, flame oxidation methods, flame hydrolysis methods, OVD (outside vapor deposition), IVD (inside vapor deposition), VAD (vapor axial deposition), double crucible methods, rod-in-tube procedures, cane-in-soot method, and doped deposited silica processes. A variety of CVD (chemical vapor deposition) and plasma-enhanced CVD processes are known and are suitable for producing silica or doped silica.

Formation of silica occurs through reaction or decomposition of a silica precursor. Suitable precursors for silica include OMCTS (octamethylcyclotetrasiloxane) and $SiCl_4$. Doping is accomplished with a doping precursor. The doping precursor can be introduced with the silica precursor in the deposition process or used to treat a silica body formed from the silica precursor. Preferred doping precursors include halogen-containing gases. Suitable precursors for doping silica with bromine include $SiBr_4$. Suitable precursors for doping silica with chlorine include $Cl_2$, $SiCl_4$, $Si_2Cl_6$, $Si_2OCl_6$, and $CCl_4$. Suitable precursors for doping silica with fluorine include $F_2$, $CF_4$, and $SiF_4$. The silica precursor and/or doping precursor is preferably provided as a gas to the deposition process. The gas phase silica precursor or gas phase doping precursor is supplied undiluted or in combination with an inert diluent gas (e.g. He, $N_2$, Ar).

Figure 6A:
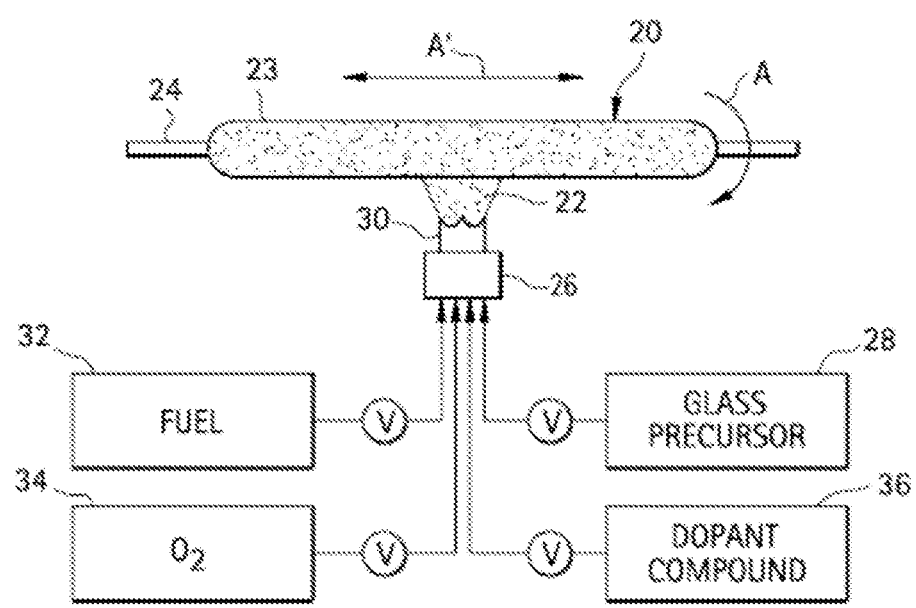
FIG. 6A is a schematic depiction of soot preform deposition via an OVD process.
Figure 6B:
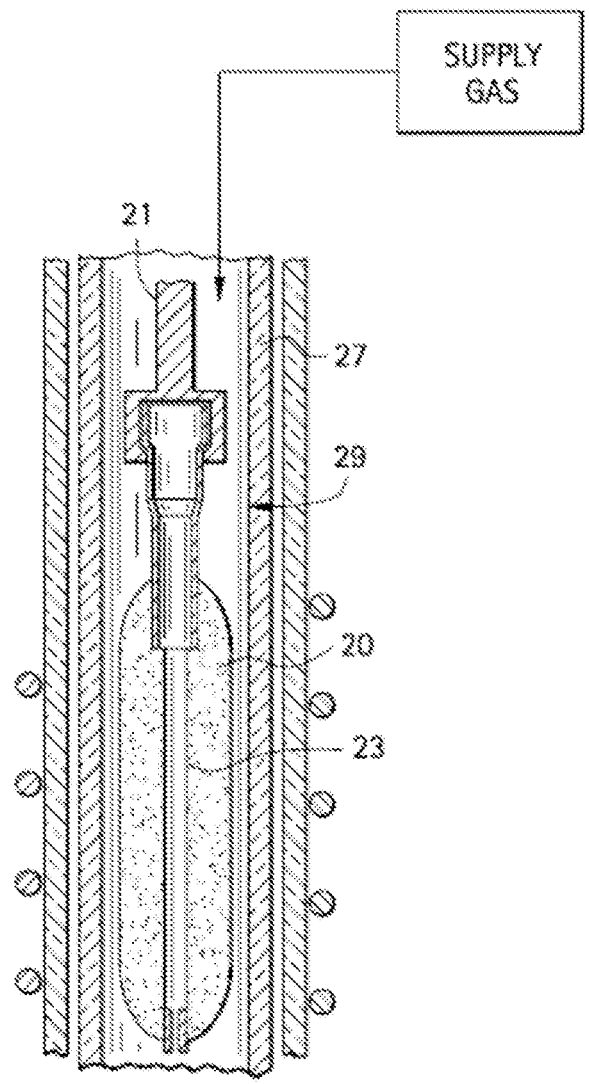
FIG. 6B depicts an apparatus for doping and consolidating a soot preform.

The preform is made by forming the core region and cladding regions in one or more process steps. Typical process steps include soot deposition, doping, and consolidation. By way of illustration and not intended to be limiting, formation of a silica or doped silica in the form of a core soot body according to the OVD method is illustrated in FIGS. 6A and 6B. In FIG. 6A, core soot body 20 is formed by depositing silica-containing soot 22 onto the outer surface of a rotating and translating mandrel 24. Mandrel 24 is preferably tapered. The soot 22 for core soot body 20 is formed by providing a glass/soot precursor 28 in gaseous form to the flame 30 of a burner 26 to oxidize, hydrolyze, combust, or otherwise react or decompose it. Fuel 32, such as methane ($CH_4$), and a combustion supporting gas 34, such as oxygen, are provided to the burner 26 and ignited to form the flame 30. A dopant compound 36 is also optionally provided to the burner 26. Mass flow controllers, labelled V, meter the appropriate amounts of glass/soot precursor 28, fuel 32, combustion supporting gas 34, and dopant compound 36, all preferably in gaseous form, to the burner 26. The glass/soot precursor 28 is a glass former compound (e.g. silica precursor) and is oxidized in the flame 30 to form a generally cylindrical core soot region 23.

FIG. 6B illustrates another process for doping core soot body 20. Prior to consolidation, the bait rod 24 illustrated in FIG. 6A is removed to form a hollow, cylindrical core soot body. During the doping and consolidation process, the core soot body 20 is suspended, for example, inside a pure quartz muffle tube 27 of the furnace 29 by a holding mechanism 21. Prior to or during the consolidation step, the core soot body 20 is optionally exposed to a doping precursor. The doping precursor is preferably provided in gas-phase form and is supplied directly to core soot body 20 before or during consolidation. In one embodiment, the gas-phase doping precursor is a vapor formed by heating or evaporating a liquid precursor. The doping precursor is supplied neat (undiluted) or in combination with a diluent gas. The doping concentration can be controlled by controlling, without limitation, the temperature of doping, the temperature of vaporization of a liquid doping precursor, the pressure or partial pressure of a gas-phase doping precursor in the processing ambient of the core soot body, time of doping, number of doping cycles, and the porosity or surface area of the core soot body (high porosity and/or high surface area promote higher doping concentrations).

In one embodiment after doping, the core soot body is consolidated to form densified glass with the composition and refractive index profile of the core of the optical fiber.

Typical temperatures of consolidation are in the range from 1100° C. to 1600° C. The densified glass has a density of at least 1.90 g/cm$^3$. After densification, the densified core glass is optionally redrawn to desired dimensions and is used as a substrate for depositing additional concentric soot layers having the composition and relative refractive index of the cladding regions. Alternatively, the additional concentric soot cladding layers can be deposited on the core soot body before consolidation and the combination of layers can be consolidated to form a preform.

Figure 7A:
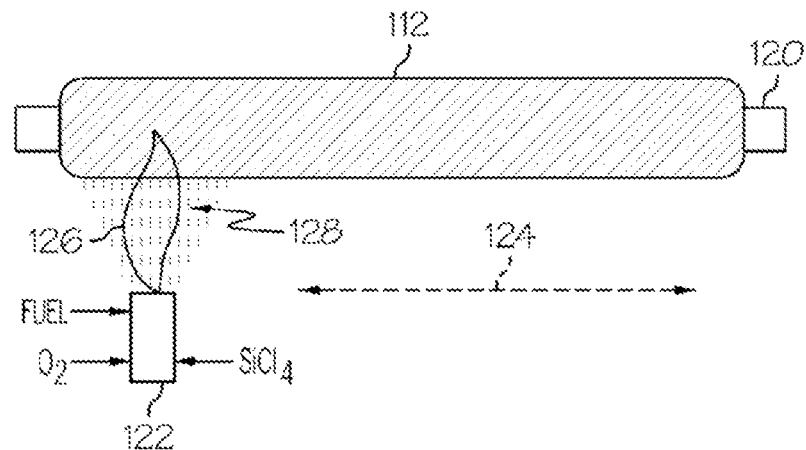
FIGS. 7A-7C depict deposition of a plurality of soot layers on a substrate.
Figure 7B:
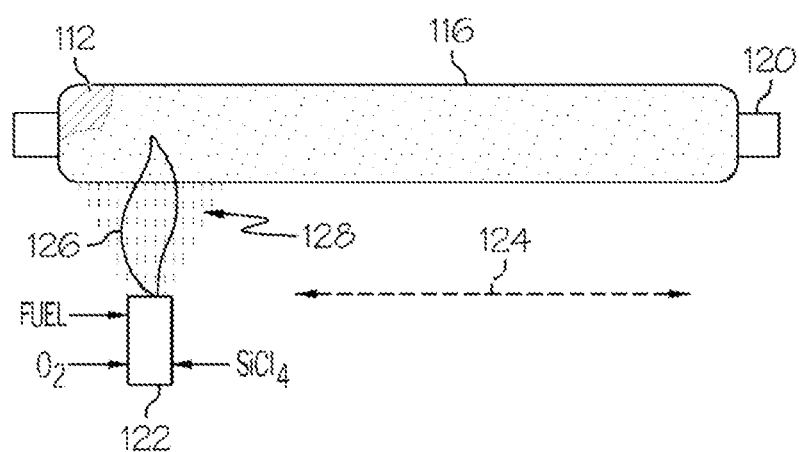
Figure 7C:
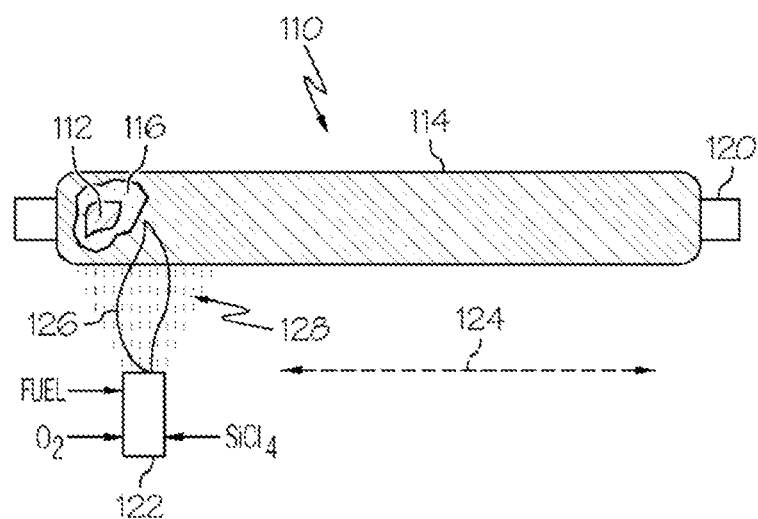
Figure 8A:
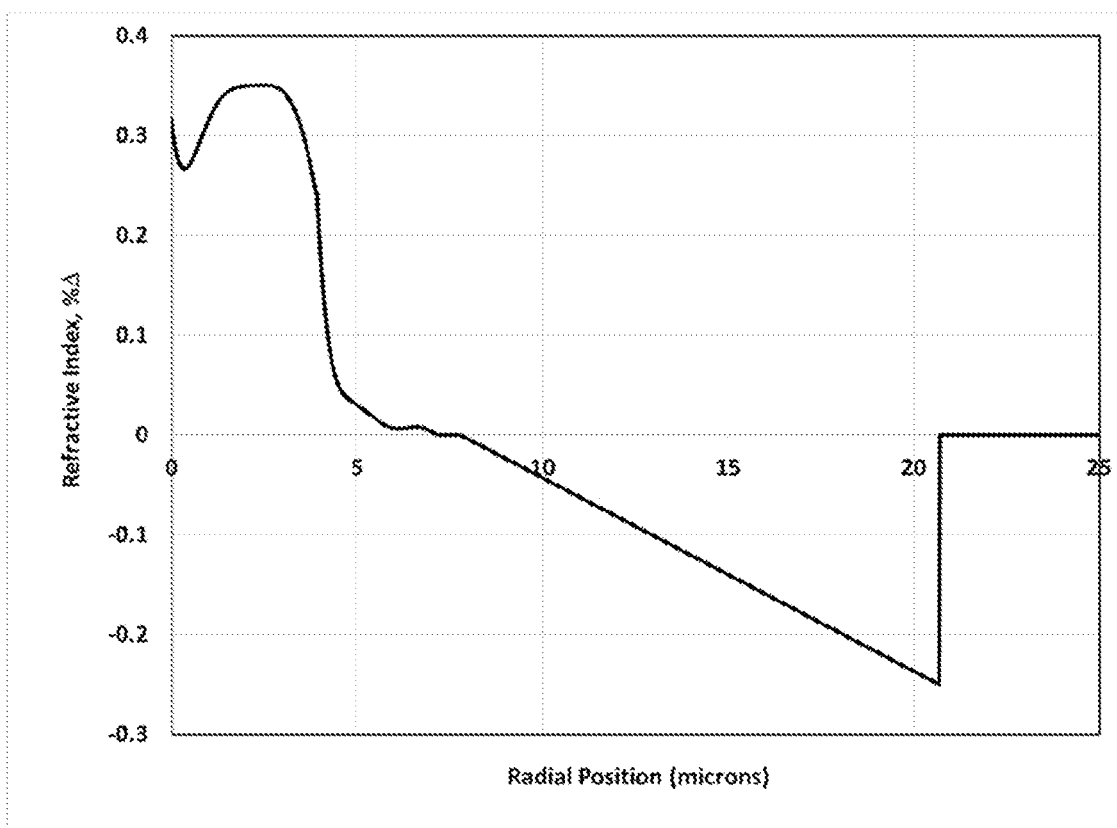
FIGS. 8A-8F illustrate representative relative refractive index profiles of optical fibers.
Figure 8B:
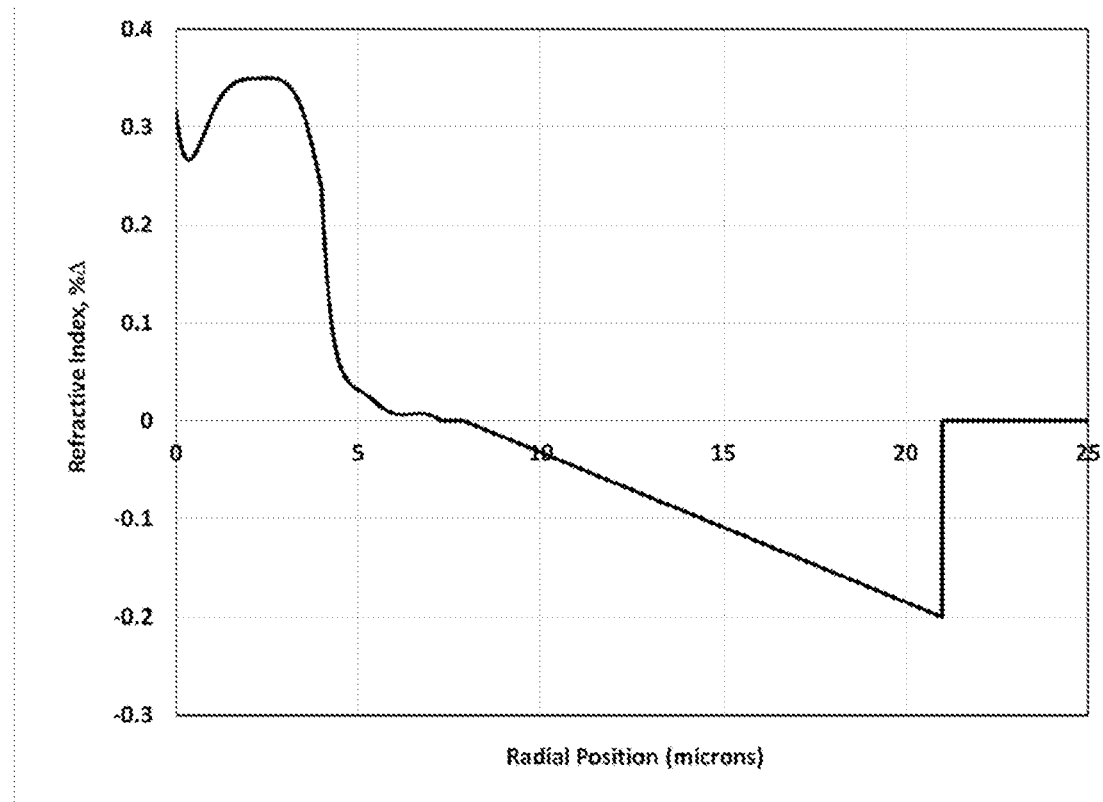
Figure 8C:
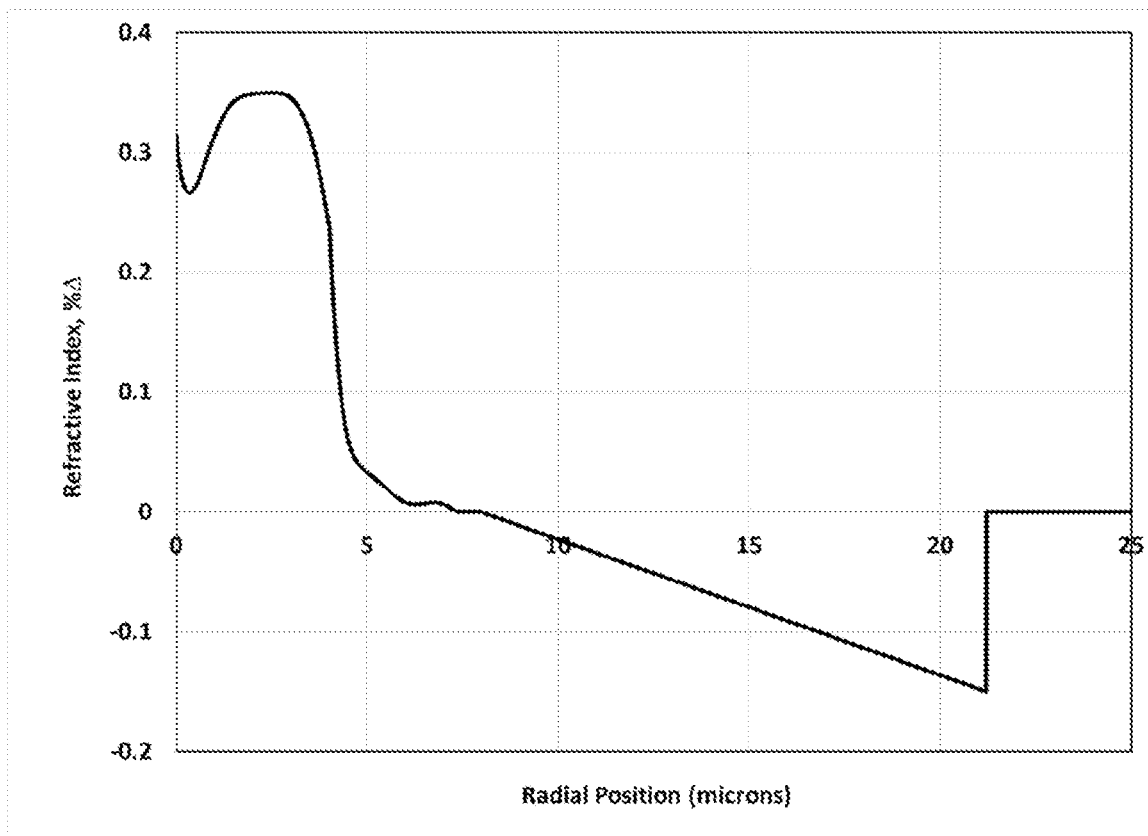
Figure 8D:
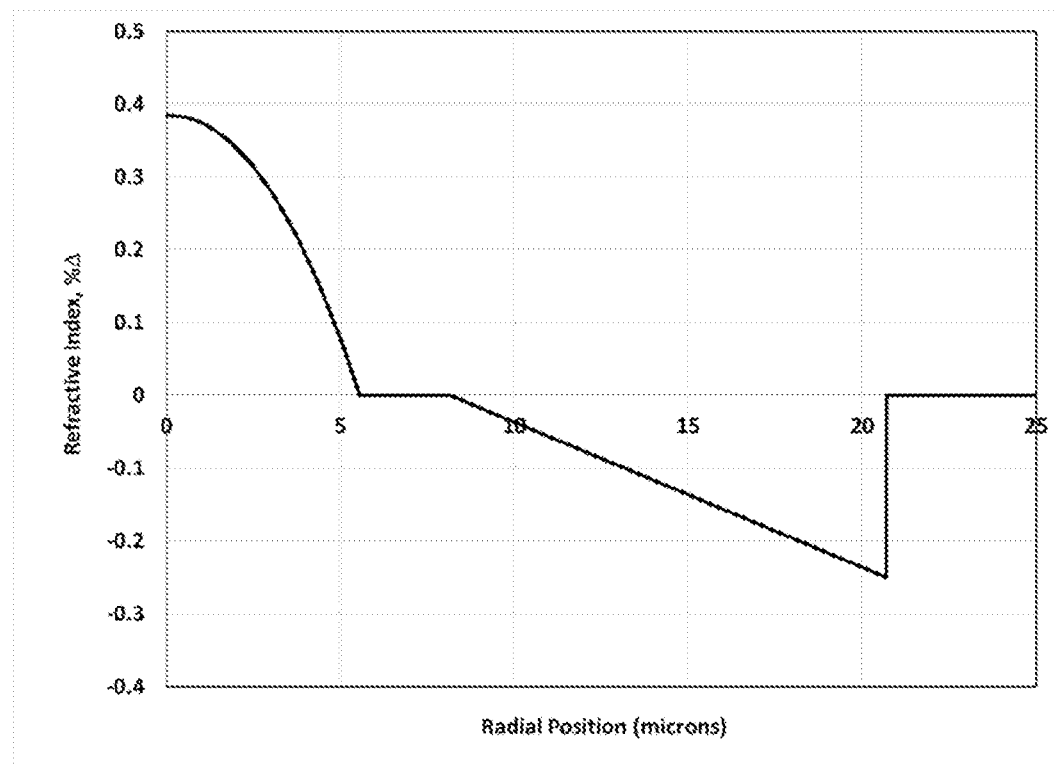
Figure 8E:
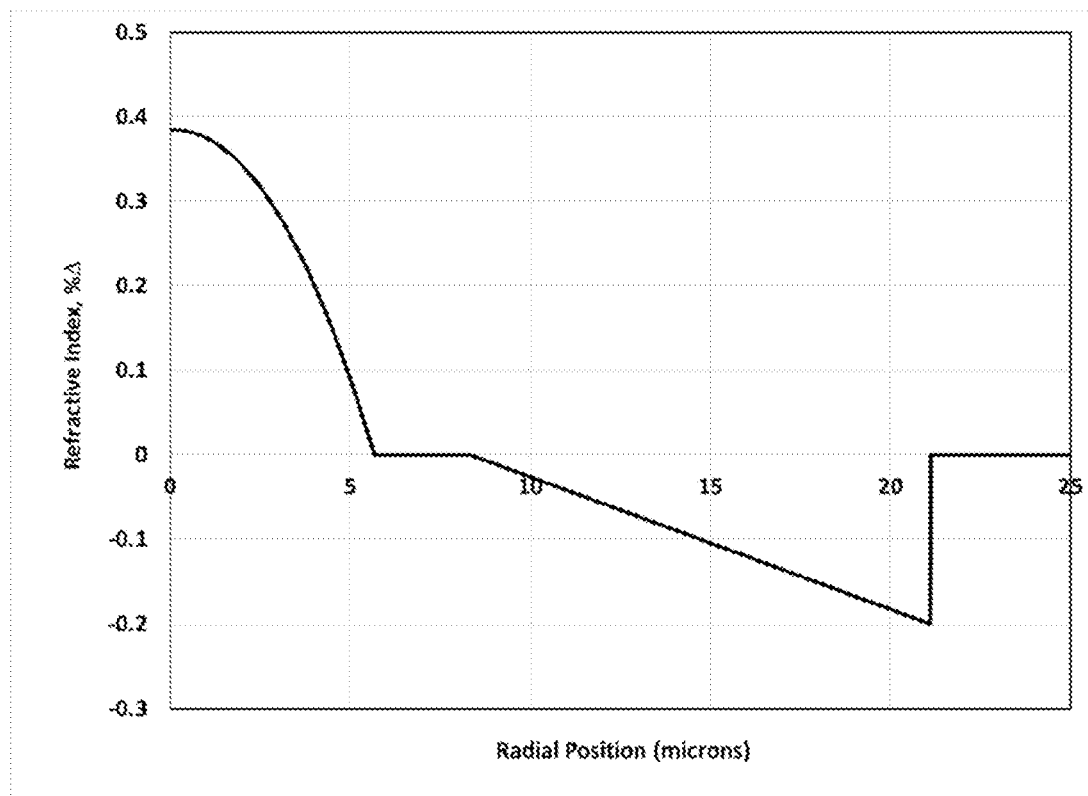
Figure 8F:
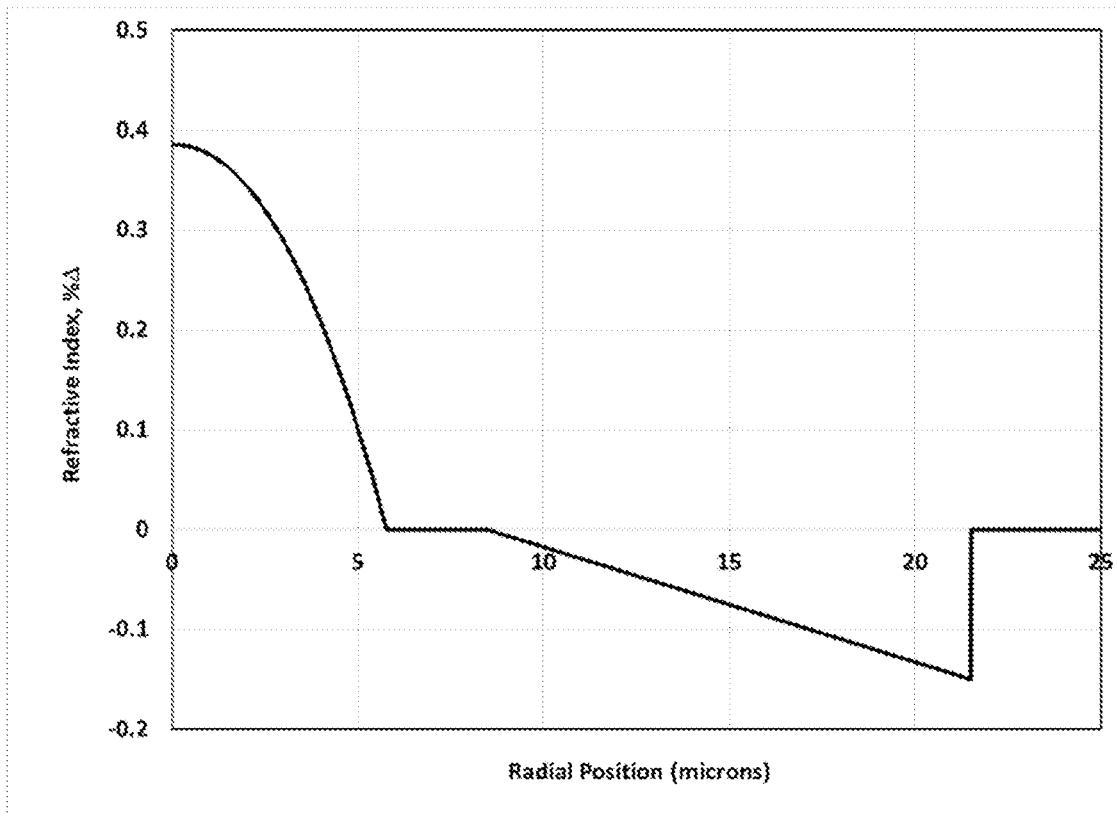

FIGS. 7A-7C illustrate fabrication of a soot body having three porous soot layers. It is recognized, however, that the procedure outlined is generally applicable to a soot bodies having any number of porous soot layers.

FIG. 7A illustrates deposition of a silica-based soot layer 112 on substrate 120. The silica-based glass soot is formed by providing a vapor phase silica-based glass precursor material, such as SiCl$_4$ or octamethylcyclotetrasiloxane (OMCTS), to a burner 122. The gas-fed burner 122 is supplied with fuel, such as H$_2$, CH$_4$, D$_2$ (deuterium), CD$_4$ or CO. Oxygen is also provided to burner 122 and the fuel and oxygen are combusted to create flame 126. In some embodiments, the vapor phase silica-based glass precursor material is SiCl$_4$ and the gas-fed burner 122 is supplied with a non-hydrogenated fuel such as D$_2$, CD$_4$ or CO in order to limit the amount of residual OH in the deposited silica-based glass soot. The vapor phase silica-based glass precursor material may be delivered to the burner at a flow rate from about 4 L/min to about 10 L/min, while the fuel may be supplied to the burner at a flow rate from about 10 L/min to about 40 L/min.

The vapor phase silica-based glass precursor material is reacted in the flame 126 to produce silica-based glass soot 128, which is deposited as soot layer 112 on substrate 120 as the bait rod is rotated. The rotation rate may be from about 20 rpm to about 400 rpm, or preferably from 30 rpm to about 100 rpm. Soot layer 112 may have the same, higher, or lower refractive index than undoped silica. Higher or lower refractive indices may be achieved by supplying an updopant or downdopant precursor to burner 122. Soot layer 112 may constitute a single-layer soot cladding monolith or may constitute the innermost (smallest radius) layer of a multi-layer soot cladding monolith. The flame 126 of the gas-fed burner 122 is traversed back and forth along the axial length of the substrate 120 as indicated by arrow 124 as the bait rod is rotated thereby building up silica-based glass soot and forming soot layer 112 on the substrate 120.

FIG. 7B depicts deposition of soot layer 116 on soot layer 112. Soot layer 116 may be formed in a similar manner as soot layer 112. For example, a vapor phase silica-based glass precursor material, such as SiCl$_4$ or OMCTS, may be supplied to the gas-fed burner 122 and reacted in the flame 126 to form silica-based glass soot which is deposited as soot layer 116 on soot layer 112 as the bait rod is rotated. Soot layer 116 may have the same, higher, or lower refractive index than soot layer 112.

FIG. 7C depicts deposition of soot layer 114 on soot layer 116. Soot layer 114 may be formed in a similar manner as soot layer 112 or soot layer 116. For example, a vapor phase silica-based glass precursor material, such as SiCl$_4$ or OMCTS, may be supplied to the gas-fed burner 122 and reacted in the flame 126 to form silica-based glass soot which is deposited as soot layer 114 on soot layer 116 as the substrate 120 is rotated. Soot layer 114 may have the same, higher, or lower refractive index than soot layer 116 or soot layer 112. Additional layers of may be deposited similarly to obtain a soot body having any desired number of layers. After deposition of the soot layers, the soot body is consolidated to form a preform.

Process conditions used to form the different layers of a multilayer soot body may be the same or different. Process variables include flame temperature, flow rates of precursors for silicon or dopants, traversal rate of the burner along the length of the substrate, and rotation rate of the substrate. The dopant concentration can be controlled by varying the flow rate of the dopant precursor, selection of dopant precursor, and temperature of doping. Dopant concentration distributions that are uniform or variable in the radial direction are achievable. To form a trench cladding region with a relative refractive index that decreases monotonically in the radial direction, the concentration of downdoping precursor (e.g. SiF$_4$) is progressively increased during deposition of the trench cladding layer during soot deposition as the concentric monolayers of trench cladding soot are formed. Further discussion of forming trench cladding regions with a monotonically decreasing relative refractive index is given in U.S. Pat. No. 9,975,802, the disclosure of which is hereby incorporated by reference herein. The flow of downdoping precursor is terminated at the transition from the soot layer corresponding to the trench cladding region to the soot layer corresponding to the outer cladding region. Variations in process conditions can control the deposition rate of soot and density of soot in the as-deposited state. The flame temperature may be 1500° C. or higher. Higher flame temperatures promote higher as-deposited soot density. Conversely, lower flame temperatures lower as-deposited soot density.

In one embodiment, substrate 120 is a consolidated glass having the composition and refractive index of the core region of the optical fiber to be drawn from the preform. In this embodiment, the soot layers 112, 116, and 114 correspond to different portions of the cladding region (e.g. offset cladding region, trench cladding region, and outer cladding region). In another embodiment, substrate 120 is a bait rod, soot layer 112 corresponds to the core region, and soot layers 116 and 114 correspond to two different portions of the cladding region (e.g. trench cladding region and outer cladding region). The soot layers, when consolidated, provide a preform configured to permit drawing of optical fibers having the relative refractive index profiles disclosed herein.

Optical Fiber Draw Process. In a continuous optical fiber manufacturing process, a glass fiber is drawn from a heated preform and sized to a target diameter (typically 125 μm, corresponding to $r_4$=62.5 μm). The glass fiber is then cooled and directed to a coating system that applies a liquid primary coating composition to the glass fiber. Two process options are viable after application of the liquid primary coating composition to the glass fiber. In one process option (wet-on-dry process), the liquid primary coating composition is cured to form a solidified primary coating, the liquid secondary coating composition is applied to the cured primary coating, and the liquid secondary coating composition is cured to form a solidified secondary coating. In a second process option (wet-on-wet process), the liquid secondary coating composition is applied to the liquid primary coating composition, and both liquid coating compositions are cured simultaneously to provide solidified primary and secondary coatings. After the fiber exits the coating system, the fiber is collected and stored at room temperature. Collection of the fiber typically entails winding the fiber on a spool and storing the spool.

In some processes, the coating system further applies a tertiary coating composition to the secondary coating and cures the tertiary coating composition to form a solidified tertiary coating. Typically, the tertiary coating is an ink layer used to mark the fiber for identification purposes and has a composition that includes a pigment and is otherwise similar to the secondary coating. The tertiary coating is applied to the secondary coating and cured. The secondary coating has typically been cured at the time of application of the tertiary coating. The primary, secondary, and tertiary coating compositions can be applied and cured in a common continuous manufacturing process. Alternatively, the primary and secondary coating compositions are applied and cured in a common continuous manufacturing process, the coated fiber is collected, and the tertiary coating composition is applied and cured in a separate offline process to form the tertiary coating.

The wavelength of curing radiation is infrared, visible, or ultraviolet (UV). Representative wavelengths include wavelengths in the range from 250 nm to 1000 nm, or in the range from 250 nm to 700 nm, or in the range from 250 nm to 450 nm, or in the range from 275 nm to 425 nm, or in the range from 300 nm to 400 nm, or in the range from 320 nm to 390 nm, or in the range from 330 nm to 380 nm, or in the range from 340 nm to 370 nm. Curing can be accomplished with light sources that include a lamp source (e.g. Hg lamp), an LED source (e.g. a UVLED, visible LED, or infrared LED), or a laser source.

Each of the primary, secondary, and tertiary compositions are curable with any of the wavelengths and any of the light sources referred to above. The same wavelength or source can be used to cure each of the primary, secondary, and tertiary compositions, or different wavelengths and/or different sources can be used to cure the primary, secondary, and tertiary compositions. Curing of the primary, secondary, and tertiary compositions can be accomplished with a single wavelength or a combination of two or more wavelengths.

To improve process efficiency, it is desirable to increase the draw speed of the fiber along the process pathway extending from the preform to the collection point. As the draw speed increases, however, the cure speed of coating compositions must increase. The coating compositions disclosed herein are compatible with fiber draw processes that operate at a draw speed greater than 35 m/s, or greater than 40 m/s, or greater than 45 m/s, or greater than 50 m/s, or greater than 55 m/s, or greater than 60 m/s, or greater than 65 m/s, or greater than 70 m/s.

EXAMPLES

The following modelled examples illustrate optical fibers having cladding regions with a trench cladding region configured to minimize macrobend losses at bend diameters of 15 mm, 20 mm, and 30 mm. FIGS. 8A-8F show relative refractive index profiles for six example optical fibers (Ex. 1-Ex. 6). Table 1 lists parameters of the relative refractive index, radial dimensions, and selected properties for each of the six example optical fibers listed in Table 1. The shape of the trench cladding region of each of Ex. 1-Ex. 6 is triangular. Table 2 lists parameters of the relative refractive index, radial dimensions, and selected properties for four example optical fibers (Ex. 7-Ex. 10). The shape of the trench cladding region of each of Ex. 7-Ex. 10 is rectangular. Each of the example optical fibers included a core region, an offset cladding region surrounding and directly adjacent to the core region, a trench cladding region surrounding and immediately adjacent to the offset cladding region, and an outer cladding region surrounding and directly adjacent to the trench cladding region. The relative refractive index and outer radius of each region is listed in Tables 1 and 2. The core regions of Examples 1-3 included a step-index relative refractive index profile with a centerline dip. The core regions of Ex. 4-6 included a graded index relative refractive index profile ($\alpha$-profiles) with a value $\alpha$=2.12. The trench cladding region of each of the Ex. 1-Ex. 6 exhibited a monotonic decrease in relative refractive radius between inner radius $r_2$ and outer radius $r_3$. The monotonic decrease for each Ex. 1-Ex. 6 had a constant or approximately constant slope and the trench cladding region for each of Ex. 1-Ex. 6 is an embodiment of a triangular trench. $V_3$ is the trench volume of the trench cladding region. MFD refers to mode field diameter and is given at 1310 nm and 1550 nm. $A_{eff}$ refers to effective area and is given at 1310 nm and 1550 nm. $\lambda_0$ is the zero dispersion wavelength.

Macrobend loss was calculated at 1550 nm for mandrel diameters of 15 mm, 20 mm, and 30 mm. The conditions used in the computation of macrobend loss were in accordance with the mandrel wrap test specified in standard TIA-455-62: FOTP-62 IEC-60793-1-47 Optical Fibres—Part 1-47: Measurement Methods and Test Procedures—Macrobending Loss, by Telecommunications Industry Association (TIA). In the mandrel wrap test, the fiber is wrapped one or more times around a smooth cylindrical mandrel having a specified diameter, and the increase in attenuation at a specified wavelength due to the bending is determined. Macrobend loss is expressed in units of dB/turn, where dB refers to decibels and one turn refers to one revolution of the fiber about the mandrel.

TABLE 1

|  | Ex. 1 | Ex. 2 | Ex. 3 | Ex. 4 | Ex. 5 | Ex. 6 |
| --- | --- | --- | --- | --- | --- | --- |
| $\Delta_{1max}$ (%) | 0.35 | 0.35 | 0.35 | 0.385 | 0.385 | 0.385 |
| $r_1$ (microns) | 4.4 | 4.47 | 4.51 | 5.57 | 5.84 | 5.95 |
| $\alpha$ | 12 | 12 | 12 | 2.12 | 2.12 | 2.12 |
| $\Delta_2$ (%) | 0 | 0 | 0 | 0 | 0 | 0 |
| $r_2$ (microns) | 7.8 | 7.91 | 7.99 | 8.16 | 8.32 | 8.48 |
| $\Delta_{3,min}$ (%) | -0.25 | -0.2 | -0.15 | -0.25 | -0.2 | -0.15 |
| $r_3$ (microns) | 20.7 | 21 | 21.2 | 20.7 | 21.1 | 21.5 |
| $V_3$ (% $\Delta$micron$^2$) | 53 | 43.6 | 33.36 | 51.86 | 43.1 | 33.57 |
| $\Delta_4$ (%) | 0 | 0 | 0 | 0 | 0 | 0 |
| MFD at 1310 nm (micron) | 9.15 | 9.2 | 9.24 | 9.16 | 9.22 | 9.27 |
| $A_{eff}$ at 1310 nm (micron$^2$) | 65.9 | 66.76 | 67.38 | 63.68 | 64.33 | 65.39 |
| $\lambda_0$ (nm) | 1317 | 1316 | 1316 | 1323 | 1322 | 1321 |
| Dispersion at 1310 nm (ps/nm/km) | -0.616 | -0.528 | -0.528 | -1.170 | -1.080 | -0.988 |

TABLE 1-continued

|  | Ex. 1 | Ex. 2 | Ex. 3 | Ex. 4 | Ex. 5 | Ex. 6 |
|---|---|---|---|---|---|---|
| Dispersion Slope at 1310 nm (ps/nm2/km) | 0.088 | 0.088 | 0.0880 | 0.09 | 0.09 | 0.0898 |
| MFD at 1550 nm (micron) | 10.37 | 10.42 | 10.46 | 10.44 | 10.49 | 10.55 |
| $A_{eff}$ at 1550 nm (micron$^2$) | 82.14 | 83.09 | 83.81 | 81.64 | 82.4 | 83.49 |
| Dispersion at 1550 nm (ps/nm/km) | 17.4 | 17.42 | 17.39 | 17.09 | 17.1 | 17.21 |
| Dispersion Slope at 1550 nm (ps/nm2/km) | 0.061 | 0.061 | 0.06 | 0.063 | 0.062 | 0.062 |
| Cable Cutoff (nm) | 1227 | 1220 | 1204 | 1217 | 1217 | 1215 |
| Bend Loss for 15 mm mandrel diameter at 1550 nm (dB/turn) | 0.105 | 0.184 | 0.370 | 0.123 | 0.188 | 0.329 |
| Bend Loss for 20 mm mandrel diameter at 1550 nm (dB/turn) | 0.0159 | 0.0240 | 0.0426 | 0.0186 | 0.0238 | 0.0384 |
| Bend Loss for 30 mm mandrel diameter at 1550 nm (dB/turn) | 0.0029 | 0.0030 | 0.0034 | 0.0034 | 0.0032 | 0.0034 |

TABLE 2

|  | Example 7 | Example 8 | Example 9 | Example 10 |
|---|---|---|---|---|
| $\Delta_{1max}$ (%) | 0.337 | 0.337 | 0.337 | 0.332 |
| $r_1$ (microns) | 4.6 | 4.6 | 4.515 | 4.6 |
| α | 12 | 12 | 12 | 12 |
| $\Delta_2$ (%) | 0 | 0 | 0 | 0 |
| $r_2$ (microns) | 10.42 | 10.42 | 11 | 10.9 |
| Trench Shape | Rectangular | Rectangular | Rectangular | Rectangular |
| $\Delta_{3, min}$ (%) | −0.2 | −0.2 | −0.2 | −0.2 |
| $r_3$ (micron) | 17 | 18.5 | 19 | 18.9 |
| $V_3$ (%Δmicron$^2$) | 36.72 | 47.31 | 48.96 | 48.45 |
| $\Delta_4$ (%) | 0 | 0 | 0 | 0 |
| MFD at 1310 nm (micron) | 9.19 | 9.19 | 9.2 | 9.23 |
| $A_{eff}$ at 1310 nm (micron$^2$) | 65.33 | 65.3 | 65.47 | 65.91 |
| $\lambda_0$ (nm) | 1313 | 1313 | 1314 | 1315 |
| Dispersion at 1310 nm (ps/nm/km) | −0.267 | −0.267 | −0.356 | −0.445 |
| Dispersion Slope at 1310 nm (ps/nm$^2$/km) | 0.089 | 0.089 | 0.089 | 0.089 |
| MFD at 1550 nm (micron) | 10.41 | 10.43 | 10.43 | 10.47 |
| $A_{eff}$ at 1550 nm (micron$^2$) | 82.11 | 82.43 | 82.44 | 83.1 |
| Dispersion at 1550 nm (ps/nm/km) | 17.4 | 17.4 | 17.4 | 17.4 |
| Dispersion Slope at 1550 nm (ps/nm$^2$/km) | 0.062 | 0.062 | 0.062 | 0.062 |
| Cable Cutoff (nm) | 1206 | 1234 | 1239 | 1215 |
| Bend Loss for 15 mm mandrel diameter at 1550 nm (dB/turn) | 0.2947 | 0.1262 | 0.114 | 0.14089 |
| Bend Loss for 20 mm mandrel diameter at 1550 nm (dB/turn) | 0.0395 | 0.0169 | 0.0152 | 0.0225 |
| Bend Loss for 30 mm mandrel diameter at 1550 nm (dB/turn) | 0.003 | 0.0016 | 0.0014 | 0.0027 |

The mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The mode field diameter at 1550 nm of optical fibers disclosed herein is greater than 10.2 µm, or greater than 10.3 µm, or greater than 10.4 µm, or greater than 10.5 µm, or greater than 10.6 µm, or in the range from 10.2 µm to 10.6 µm, or in the range from 10.3 µm to 10.5 µm.

The zero dispersion wavelength of optical fibers disclosed herein is in the range from 1300 nm to 1324 nm.

The cable cutoff wavelength of the optical fibers disclosed herein is less than 1260 nm, or less than 1250 nm, or less than 1240 nm, or less than 1230 nm, or less than 1220 nm, or less than 1210 nm, or in the range from 1200 nm to 1260 nm, or in the range from 1210 nm to 1250 nm, or in the range from 1220 nm to 1240 nm.

The dispersion at 1310 nm of the optical fibers disclosed herein is greater than −1.0 ps/ns-km, or greater than −0.8 ps/ns-km, or greater than −0.6 ps/ns-km, or greater than −0.4 ps/ns-km, or in the range from −1.0 ps/ns-km to −0.2 ps/ns-km, or in the range from −0.8 ps/ns-km to −0.3 ps/ns-km, or in the range from −0.7 ps/ns-km to −0.4 ps/ns-km.

The dispersion at 1550 nm of the optical fibers disclosed herein is less than 21.0 ps/ns-km, or less than 19.0 ps/ns-km, or less than 17.0 ps/ns-km, or in the range from 16.0 ps/ns-km to 21.0 ps/ns-km, or in the range from 17.0 ps/ns-km to 20.0 ps/ns-km.

The macrobend loss at 1550 nm of optical fibers disclosed herein, in accordance with the mandrel wrap test using a mandrel with a diameter of 30 mm, is less than 0.0040 dB/turn, or less than 0.0035 dB/turn, or less than 0.0030 dB/turn, or in the range from 0.0025 dB/turn to 0.0040 dB/turn, or in the range from 0.0030 dB/turn to 0.0040 dB/turn, or in the range from 0.0025 dB/turn to 0.0035 dB/turn.

The macrobend loss at 1550 nm of optical fibers disclosed herein, in accordance with the mandrel wrap test using a mandrel with a diameter of 20 mm, is less than 0.0500 dB/turn, or less than 0.0400 dB/turn, or less than 0.0300 dB/turn, or less than 0.0200 dB/turn, or in the range from 0.0100 dB/turn to 0.0500 dB/turn, or in the range from 0.0150 dB/turn to 0.0450 dB/turn, or in the range from 0.0200 dB/turn to 0.0400 dB/turn.

The macrobend loss at 1550 nm of optical fibers disclosed herein, in accordance with the mandrel wrap test using a mandrel with a diameter of 15 mm, is less than 0.5000 dB/turn, or less than 0.4000 dB/turn, or less than 0.3000 dB/turn, or less than 0.2000 dB/turn, or less than 0.1000 dB/turn, or in the range from 0.1000 dB/turn to 0.5000 dB/turn, or in the range from 0.1000 dB/turn to 0.4000 dB/turn, or in the range from 0.1000 dB/turn to 0.3000 dB/turn.

The macrobend loss at 1550 nm of optical fibers disclosed herein, in accordance with the mandrel wrap test using a mandrel with a diameter of 30 mm, is less than 0.0040 dB/turn, and the macrobend loss at 1550 nm of optical fibers disclosed herein, in accordance with the mandrel wrap test using a mandrel with a diameter of 15 mm, is less than 0.5000 dB/turn, or less than 0.4000 dB/turn, or less than 0.3000 dB/turn, or less than 0.2000 dB/turn, or less than 0.1000 dB/turn, or in the range from 0.1000 dB/turn to 0.5000 dB/turn, or in the range from 0.1000 dB/turn to 0.4000 dB/turn, or in the range from 0.1000 dB/turn to 0.3000 dB/turn.

The macrobend loss at 1550 nm of optical fibers disclosed herein, in accordance with the mandrel wrap test using a mandrel with a diameter of 30 mm, is less than 0.0035 dB/turn and the macrobend loss at 1550 nm of optical fibers disclosed herein, in accordance with the mandrel wrap test using a mandrel with a diameter of 15 mm, is less than 0.5000 dB/turn, or less than 0.4000 dB/turn, or less than 0.3000 dB/turn, or less than 0.2000 dB/turn, or less than 0.1000 dB/turn, or in the range from 0.1000 dB/turn to 0.5000 dB/turn, or in the range from 0.1000 dB/turn to 0.4000 dB/turn, or in the range from 0.1000 dB/turn to 0.3000 dB/turn.

The macrobend loss at 1550 nm of optical fibers disclosed herein, in accordance with the mandrel wrap test using a mandrel with a diameter of 30 mm, is less than 0.0030 dB/turn and the macrobend loss at 1550 nm of optical fibers disclosed herein, in accordance with the mandrel wrap test using a mandrel with a diameter of 15 mm, is less than 0.5000 dB/turn, or less than 0.4000 dB/turn, or less than 0.3000 dB/turn, or less than 0.2000 dB/turn, or less than 0.1000 dB/turn, or in the range from 0.1000 dB/turn to 0.5000 dB/turn, or in the range from 0.1000 dB/turn to 0.4000 dB/turn, or in the range from 0.1000 dB/turn to 0.3000 dB/turn.

The macrobend loss at 1550 nm of optical fibers disclosed herein, in accordance with the mandrel wrap test using a mandrel with a diameter of 30 mm, is in the range from 0.0025 dB/turn to 0.0040 dB/turn and the macrobend loss at 1550 nm of optical fibers disclosed herein, in accordance with the mandrel wrap test using a mandrel with a diameter of 15 mm, is less than 0.5000 dB/turn, or less than 0.4000 dB/turn, or less than 0.3000 dB/turn, or less than 0.2000 dB/turn, or less than 0.1000 dB/turn, or in the range from 0.1000 dB/turn to 0.5000 dB/turn, or in the range from 0.1000 dB/turn to 0.4000 dB/turn, or in the range from 0.1000 dB/turn to 0.3000 dB/turn.

The macrobend loss at 1550 nm of optical fibers disclosed herein, in accordance with the mandrel wrap test using a mandrel with a diameter of 30 mm, is less than 0.0040 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 30 mm, is less than 0.0035 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 30 mm, is less than 0.0030 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 30 mm, is in the range from 0.0030 dB/turn to 0.0040 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 15 mm, is less than 0.4000 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 15 mm, is less than 0.3000 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 15 mm, is less than 0.2000 dB/turn and the mode field diameter at 1310 nm of optical fibers disclosed herein is at least 8.9 μm, or at least 9.0 μm, or at least 9.1 μm, or at least 9.2 μm, or in the range from 8.9 μm to 9.3 μm, or in the range from 9.0 μm to 9.3 μm, or in the range from 9.0 μm to 9.2 μm.

The macrobend loss at 1550 nm of optical fibers disclosed herein, in accordance with the mandrel wrap test using a mandrel with a diameter of 15 mm, is in the range from 0.1000 dB/turn to 0.4000 dB/turn and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The macrobend loss at 1550 nm of optical fibers disclosed herein, in accordance with the mandrel wrap test using a mandrel with a diameter of 30 mm, is less than 0.0040 dB/turn, and the macrobend loss at 1550 nm of optical fibers disclosed herein, in accordance with the mandrel wrap test using a mandrel with a diameter of 15 mm, is less than 0.4000 dB/turn, and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The macrobend loss at 1550 nm of optical fibers disclosed herein, in accordance with the mandrel wrap test using a mandrel with a diameter of 30 mm, is less than 0.0035 dB/turn, and the macrobend loss at 1550 nm of optical fibers disclosed herein, in accordance with the mandrel wrap test using a mandrel with a diameter of 15 mm, is less than 0.3000 dB/turn, and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The macrobend loss at 1550 nm of optical fibers disclosed herein, in accordance with the mandrel wrap test using a mandrel with a diameter of 30 mm, is less than 0.0030 dB/turn and the macrobend loss at 1550 nm of optical fibers disclosed herein, in accordance with the mandrel wrap test using a mandrel with a diameter of 15 mm, is less than 0.2000 dB/turn, and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The macrobend loss at 1550 nm of optical fibers disclosed herein, in accordance with the mandrel wrap test using a mandrel with a diameter of 30 mm, is in the range from 0.0030 dB/turn to 0.0040 dB/turn, and the macrobend loss at 1550 nm of optical fibers disclosed herein, in accordance with the mandrel wrap test using a mandrel with a diameter of 15 mm, is in the range from 0.1000 dB/turn to 0.4000 dB/turn, and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

The macrobend loss at 1550 nm of optical fibers disclosed herein, in accordance with the mandrel wrap test using a mandrel with a diameter of 30 mm, is in the range from 0.0030 dB/turn to 0.0040 dB/turn, and the macrobend loss at 1550 nm of optical fibers disclosed herein, in accordance with the mandrel wrap test using a mandrel with a diameter of 15 mm, is in the range from 0.1000 dB/turn to 0.3000 dB/turn, and the mode field diameter at 1310 nm of optical fibers disclosed herein is at least 8.9 µm, or at least 9.0 µm, or at least 9.1 µm, or at least 9.2 µm, or in the range from 8.9 µm to 9.3 µm, or in the range from 9.0 µm to 9.3 µm, or in the range from 9.0 µm to 9.2 µm.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising:
   a core region, the core region having an outer radius $r_1$ in a range from 4.0 µm to 8.0 µm and a relative refractive index profile $\Delta_1$ with a maximum relative refractive index $\Delta_{1max}$ in a range from 0.20% to 0.50%;
   a cladding region surrounding and directly adjacent to the core region, the cladding region comprising:
      a trench cladding region surrounding the core region, the trench cladding region having an inner radius $r_2$, an outer radius $r_3$, a thickness $r_3-r_2$ greater than 10 µm, a relative refractive index $\Delta_3$ with a minimum relative refractive index $\Delta_{3min}$ greater than −0.30% and less than 0.00%, and a trench volume greater than 30% µm$^2$; and
      an outer cladding region surrounding and directly adjacent to the trench cladding region, the outer cladding region having an outer radius $r_4$ and a relative refractive index $\Delta_4$ in a range from −0.10% to 0.10%; and
   wherein the optical fiber has a macrobend loss at 1550 nm, in accordance with a mandrel wrap test using a mandrel with a diameter of 15 mm, less than 0.4000 dB/turn; and
   wherein the optical fiber has a macrobend loss at 1550 nm, in accordance with a mandrel wrap test using a mandrel with a diameter of 30 mm, less than 0.0040 dB/turn.

2. The optical fiber of claim 1, wherein the maximum relative refractive index $\Delta_{1max}$ is in a range from 0.30% to 0.40%.

3. The optical fiber of claim 1, wherein the inner radius $r_2$ equals the outer radius $r_1$.

4. The optical fiber of claim 1, wherein the inner radius $r_2$ is in a range from 6.0 µm to 10.0 µm.

5. The optical fiber of claim 1, wherein the cladding region further comprises an offset cladding region surrounding and directly adjacent to the core region, the trench cladding region surrounding and directly adjacent to the offset cladding region, the offset cladding region having the $r_1$ as an inner radius, the $r_2$ as an outer radius, a thickness $r_2-r_1$ in the range from 0.5 µm to 5.0 µm, and a relative refractive index $\Delta_2$ in the range from −0.10% to 0.10%.

6. The optical fiber of claim 1, wherein the outer radius $r_3$ is in a range from 17.0 µm to 30.0 µm.

7. The optical fiber of claim 1, wherein the outer radius $r_3$ is in a range from 20.0 µm to 26.0 µm.

8. The optical fiber of claim 1, wherein the thickness $r_3-r_2$ is greater than 12 µm.

9. The optical fiber of claim 1, wherein the minimum relative refractive index $\Delta_{3min}$ is greater than −0.20%.

10. The optical fiber of claim 1, wherein the trench volume is greater than 40%μm².

11. The optical fiber of claim 1, wherein the minimum relative refractive index $\Delta_{3min}$ is greater than −0.20% and the trench volume is greater than 40%μm².

12. The optical fiber of claim 1, wherein the relative refractive index $\Delta_3$ decreases monotonically from the inner radius $r_2$ to the outer radius $r_3$.

13. The optical fiber of claim 12, wherein the relative refractive index $\Delta_3$ decreases monotonically with a constant or approximately constant slope.

14. The optical fiber of claim 12, wherein the relative refractive index $\Delta_3$ at the inner radius $r_2$ is in the range from −0.10% to 0.10% and the relative refractive index $\Delta_3$ at the outer radius $r_3$ is the $\Delta_{3min}$.

15. The optical fiber of claim 1, wherein the optical fiber has a mode field diameter at 1310 nm of at least 9.1 μm.

16. The optical fiber of claim 1, wherein the optical fiber has a macrobend loss at 1550 nm, in accordance with a mandrel wrap test using a mandrel with a diameter of 15 mm, less than 0.3000 dB/turn.

17. The optical fiber of claim 1, wherein the optical fiber has a macrobend loss at 1550 nm, in accordance with a mandrel wrap test using a mandrel with a diameter of 15 mm, less than 0.2000 dB/turn.

18. The optical fiber of claim 1, wherein the optical fiber has a macrobend loss at 1550 nm, in accordance with a mandrel wrap test using a mandrel with a diameter of 30 mm, less than 0.0030 dB/turn.

19. An optical fiber ribbon or an optical fiber cable comprising the optical fiber of claim 1.

20. An optical fiber preform for drawing the optical fiber of claim 1.

* * * * *